Nov. 2, 1965  A. LODIGE  3,215,231
ELEVATOR CATCH BRAKES
Filed Aug. 28, 1962  14 Sheets-Sheet 1

INVENTOR.
ALOIS LODIGE
BY Bair, Freeman & Molinare
Attys.

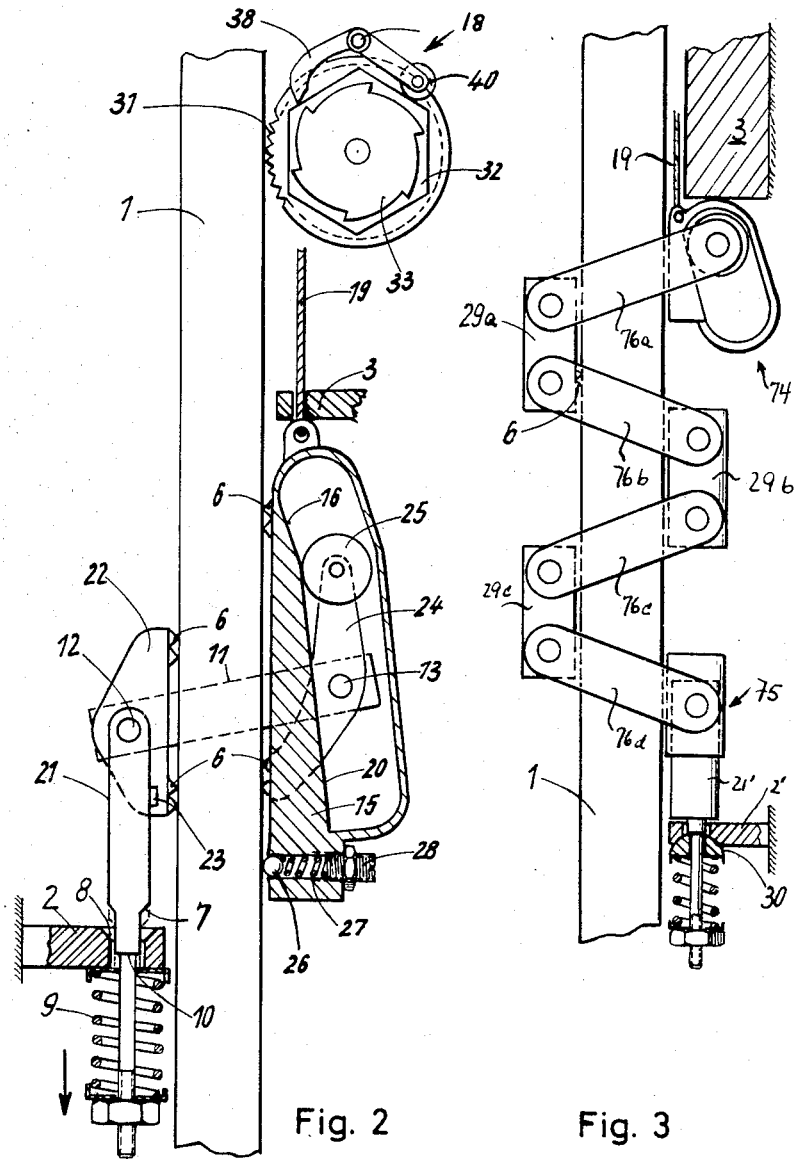

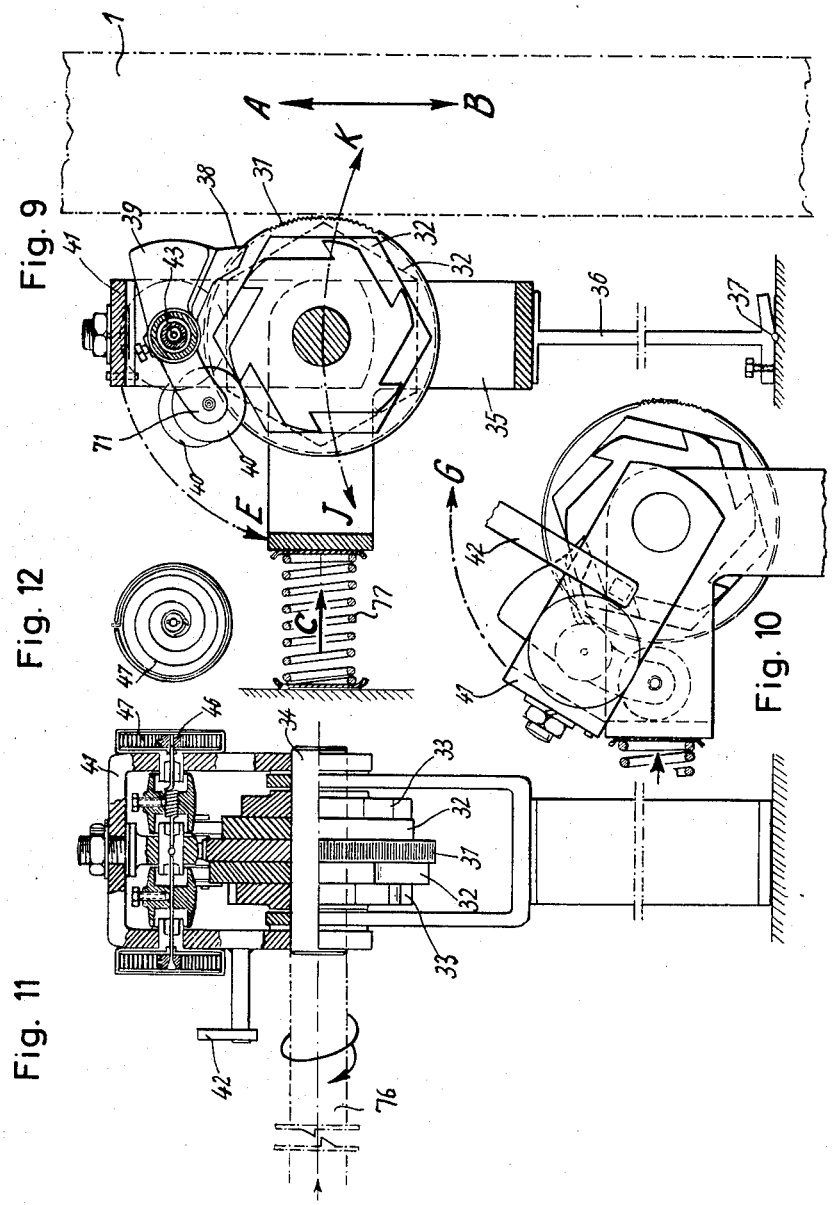

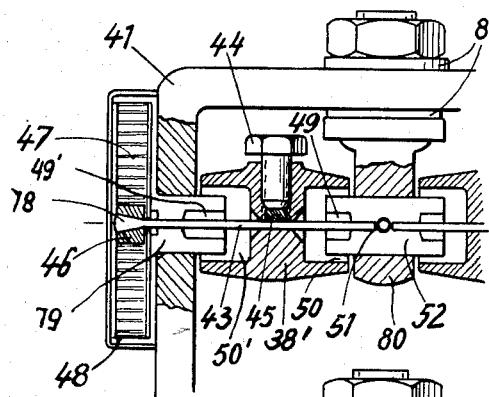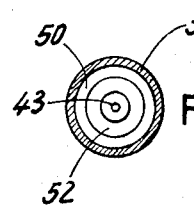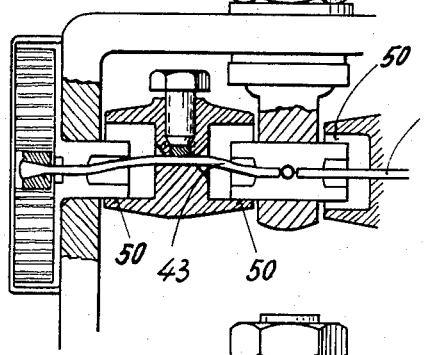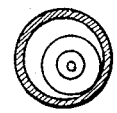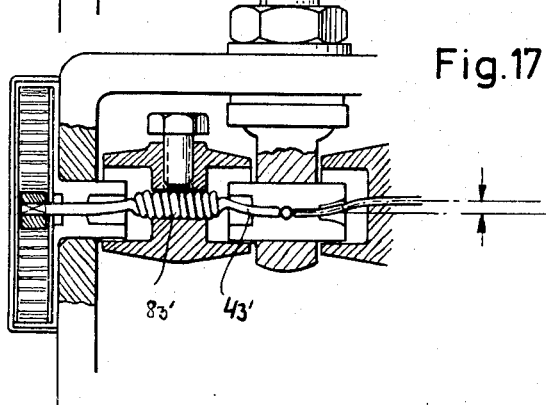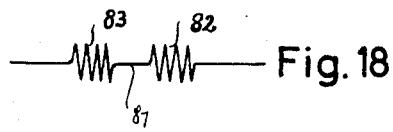

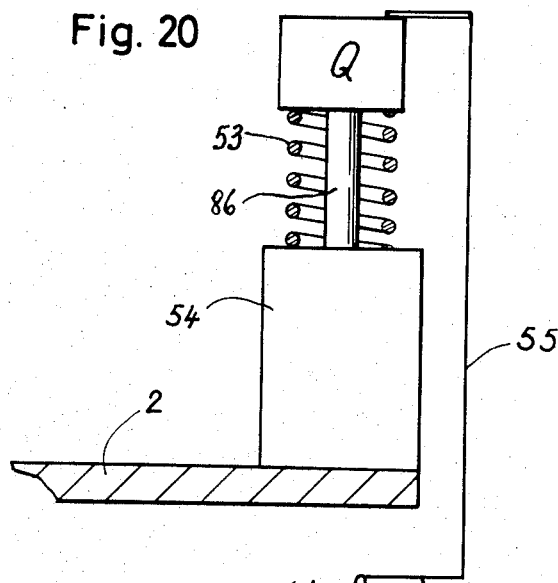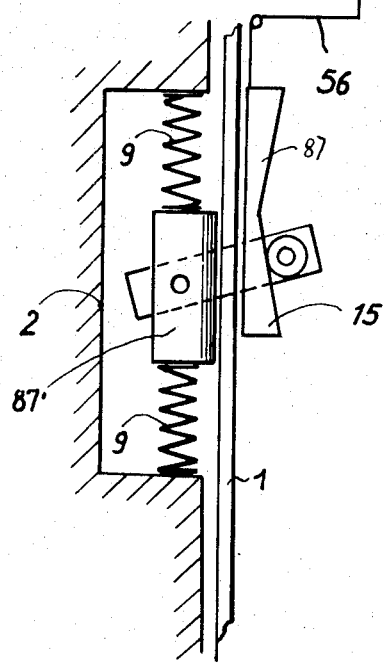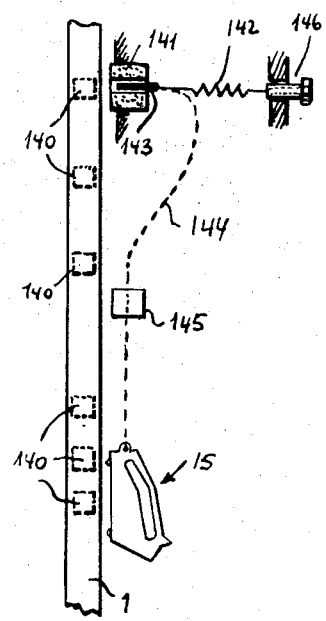

Nov. 2, 1965  A. LODIGE  3,215,231
ELEVATOR CATCH BRAKES
Filed Aug. 28, 1962  14 Sheets-Sheet 11
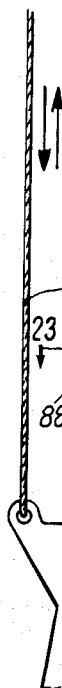
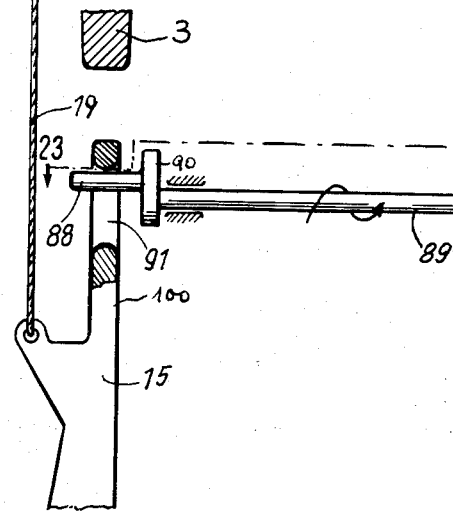
Fig. 21
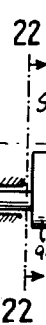
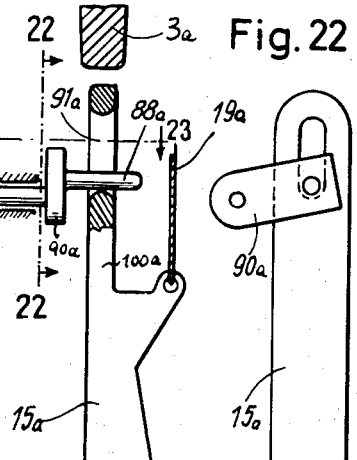
Fig. 22
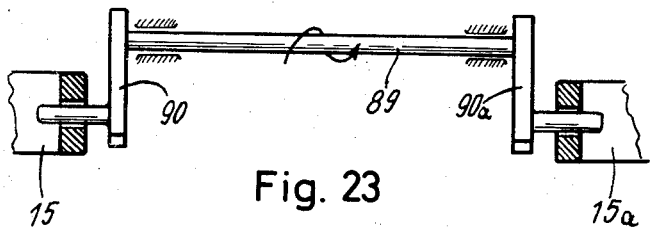
Fig. 23
INVENTOR.
ALOIS LODIGE
BY Reis, Freeman & Molinare
Attys.

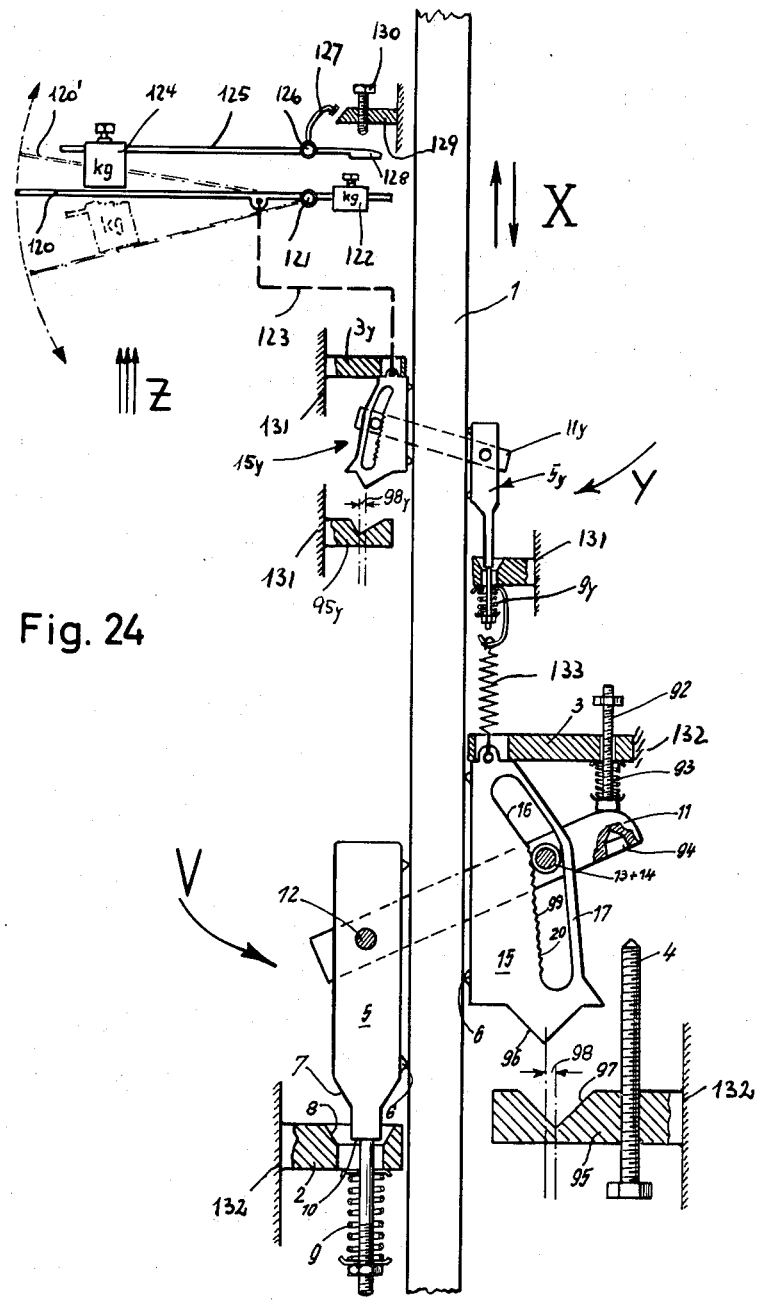

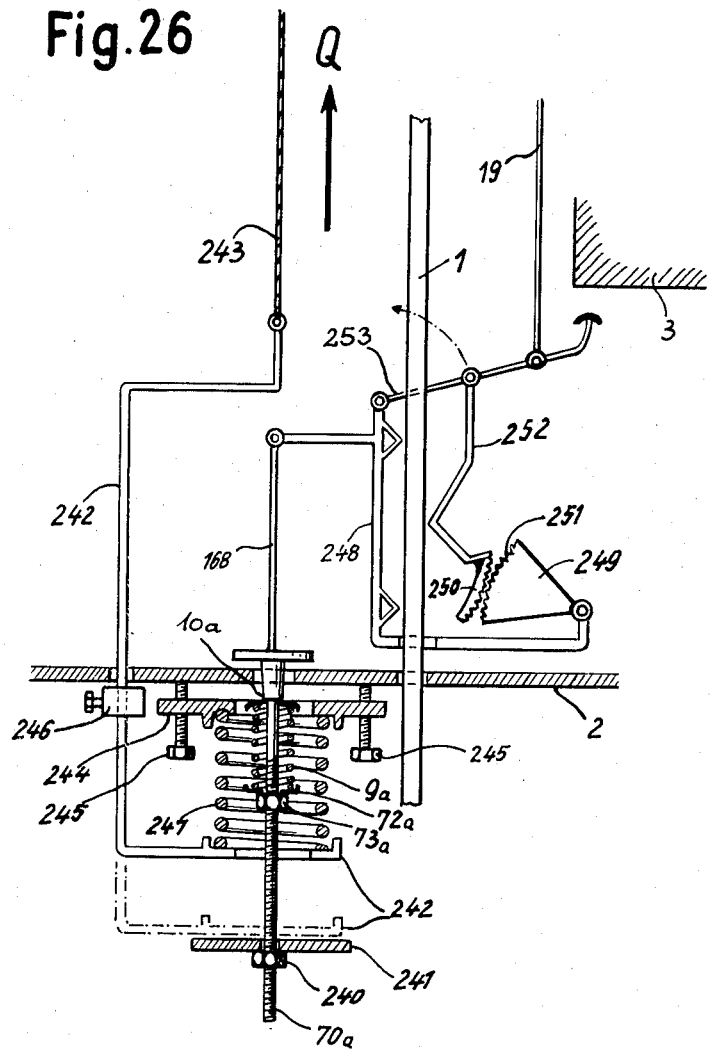

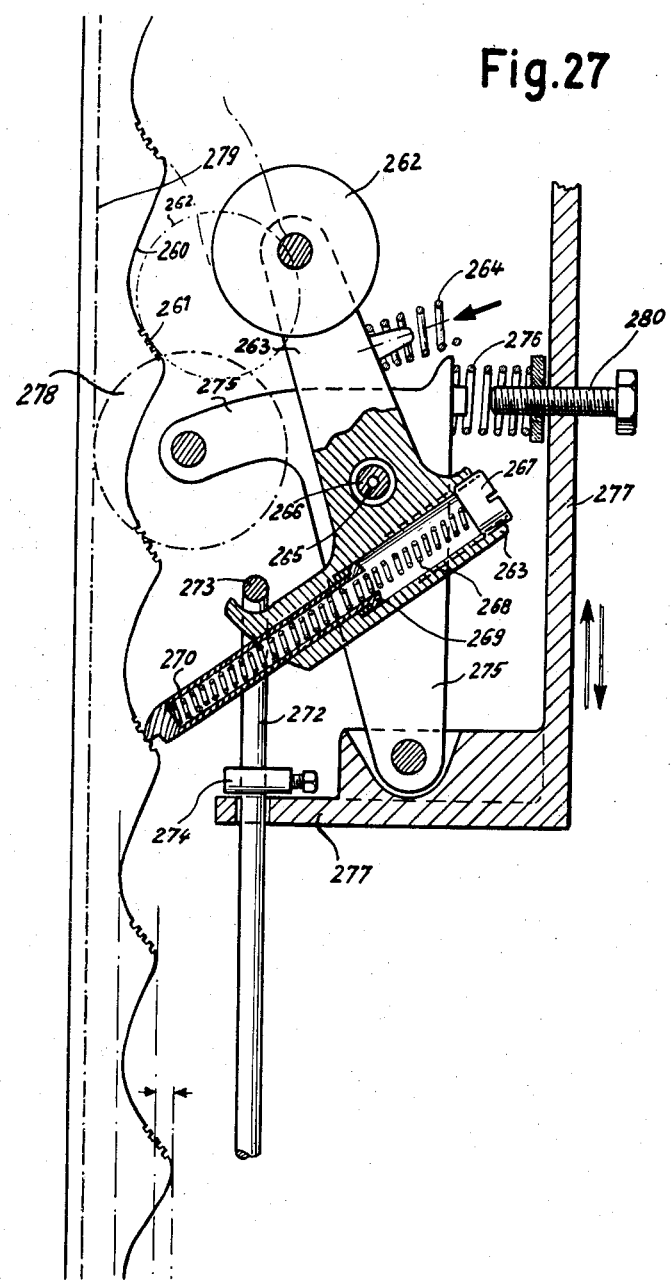

United States Patent Office 3,215,231
Patented Nov. 2, 1965

3,215,231
ELEVATOR CATCH BRAKES
Alois Lodige, 13 Frankfurter Weg, Paderborn,
Westphalia, Germany
Filed Aug. 28, 1962, Ser. No. 220,095
18 Claims. (Cl. 188—189)

This invention relates to a catch brake or automatic safety brake which is arranged on a body movable parallel to a guide and which is adapted to become operative to brake the body when the value of a predetermined parameter, especially the relative speed between the body and the guide, exceeds a given value.

Such catch brakes find general application in those cases where movable parts, due to failure of the normal control, may experience undesirably high speeds or accelerations which can lead to accidents having serious consequences. Special cases where catch brakes find application are in the field of elevating appliances such, for example, as hoists, loading appliances, lifting platforms and conveyor bands.

Catch brakes are naturally so constructed that they are inoperative during normal drive and that they only come into operation in abnormal cases of danger. Since they remain out of operation for very long periods of time, they frequently lose in the course of time both their capability of functioning and their certainty of operation, for example, because lubricants may resinify, movable parts may corrode and so on. A further disadvantage of the catch brakes known hitherto resides in the fact that after a braking operation has been effected they may be released again only with difficulty. This disadvantage is particularly noticeable in the case of sprag catch-brakes which moreover exhibit the disadvantage of an extraordinary hard and spontaneous engagement of the brakes which can lead to breakages when high energies have to be braked.

In order to avoid the disadvantages of such sprag catch-brakes, it has already been proposed to employ sliding catch-brakes, which, upon initiation of the braking operation, are pressed against the braking rail with a predetermined force acting normally to the braking surfaces. These sliding catch-brakes, which must always be employed when it is a question of high speeds, have the particularly weighty disadvantage that they are very dependent upon the co-efficient of friction between the brake shoes and the brake rail. The co-efficient of friction may vary widely according to the condition of the rubbing surfaces or also in dependence upon the speed of the body to be braked. As, on safety grounds, account has always to be taken of the smallest possible co-efficient of friction in the setting of such sliding catch-brakes, very much higher frictional forces frequently arise in the normal case of an application of the catch brake than are necessary. This means that very frequently the application of the brakes is too powerful so that also with the hitherto known sliding catch-brakes there very frequently arise the disadvantages indicated above for sprag catch-brakes, often moreover to a correspondingly increased degree because of the high speeds which are to be dealt with by the installation of sliding catch-brakes. Over and above this, sliding catch-brakes have proved to be completely unusable for those applications in which two or more catch brakes operating upon separate brake rails or guides must arrest the motion of a body because of their dependence upon fortuitous values of the co-efficient of friction. Thus when the separate catch-brakes in such a case do not respond absolutely uniformly, very serious consequences may arise for the body to be braked.

By this invention the disadvantages of all the hitherto known catch-brakes will be avoided. A catch-brake is provided which operates according to the principle of a sliding catch-brake, which initiates the braking operation smoothly and uniformly and the braking force of which, moreover, is substantially independent of the co-efficient of friction between the brake shoes and the guide.

The invention is applied to a catch-brake with at least two brake shoes mounted in a tiltable swingle and which apply themselves in a braking fashion to opposed sides of a guide by tilting of the swingle in the braking operation. The invention resides in the fact that the first brake shoe is connected with an initiating device and the second brake shoe is attached to the body to be braked by way of a pre-stressed spring and both brake shoes are so arranged displaceably relative to the body to be braked that in the braking condition the first brake shoe comes to bear upon a stop on the body to be braked with further pre-stressing of the spring associated with the second brake shoe.

The invention relates, however, not only to a particularly favorable, advantageous and suitable construction of the braking parts of the catch-brake but also to an improved arrangement of the initiating device for the catch-brake. Hitherto known initiating devices have the disadvantage of too small a sensitivity of response upon a predetermined parameter, for example the relative speed between the body to be braked and the guide, exceeding a given value. They are, therefore, not usable for the highly sensitive braking arrangement according to the invention.

Numerous details and advantages of the invention will be described below in relation to examples of construction by reference to the accompanying drawings.

In the drawings:

FIGURE 2 is a similar view of another example;

FIGURE 3 is a similar view of a third example of a catch-brake according to the invention;

FIGURE 9 is a speed regulator according to the invention shown in side elevation;

FIGURE 10 shows the regulator according to FIGURE 9 with the initiating member for the catch brake in a different position;

FIGURE 11 shows the regulator of FIGURES 9 and 10 in front elevation, partially in section;

FIGURES 12 to 16 show details of the regulator according to FIGURES 9 to 11;

FIGURE 17 shows a detail of another constructional example of the speed regulator in cross-section;

FIGURE 18 is a diagrammatic view of a detail of a further constructional form of the speed regulator;

FIGURE 20 shows a further constructional form of the catch-brake according to the invention with its initiating device;

FIGURE 21 is a diagrammatic side elevation of a mechanical coupling between two independent catch-brakes arranged on the same body;

FIGURE 22 is a section taken on the line XXII to XXII of FIGURE 21;

FIGURE 23 is a section taken on the line XXII to XXII of FIGURE 21;

FIGURE 24 shows a further modified constructional form of the catch-brake according to the invention together with another constructional form of the initiating device;

FIGURE 25 shows a further alternative constructional form of the initiating device of the catch-brake;

FIGURE 26 shows another modified form of the invention; and

FIGURE 27 shows yet another modified form of the invention.

Figure 1:
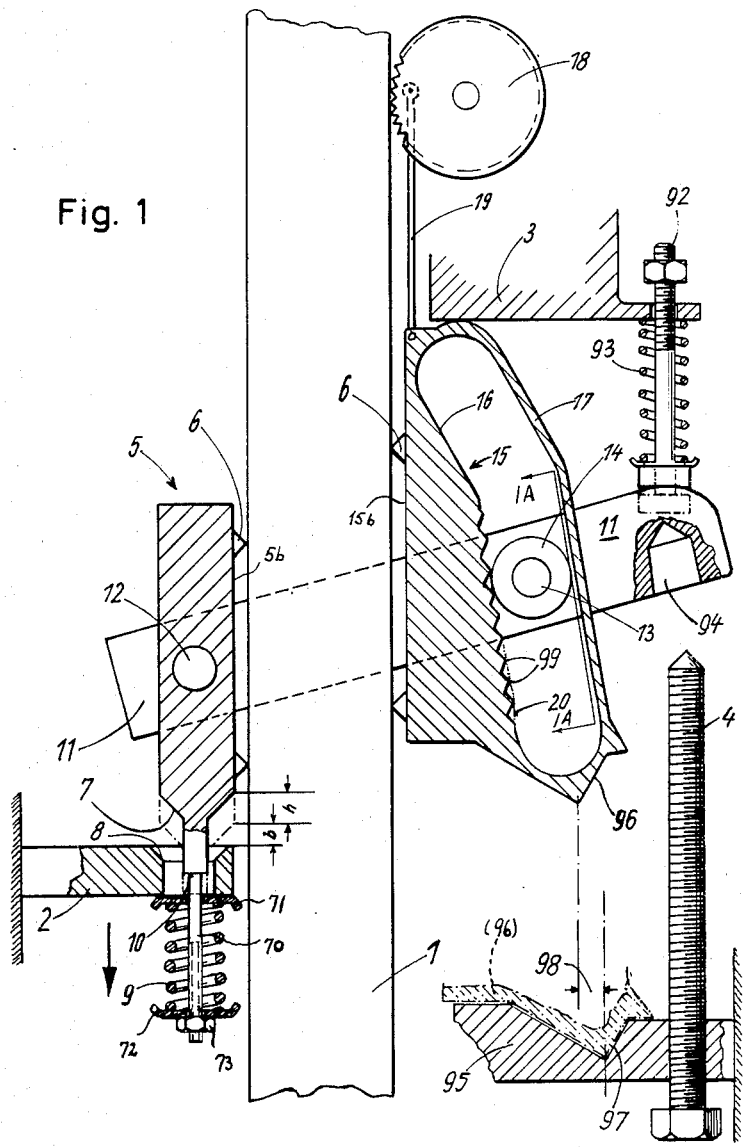
FIGURE 1 is a section of one example of a catch-brake according to the invention.
Figure 1A:
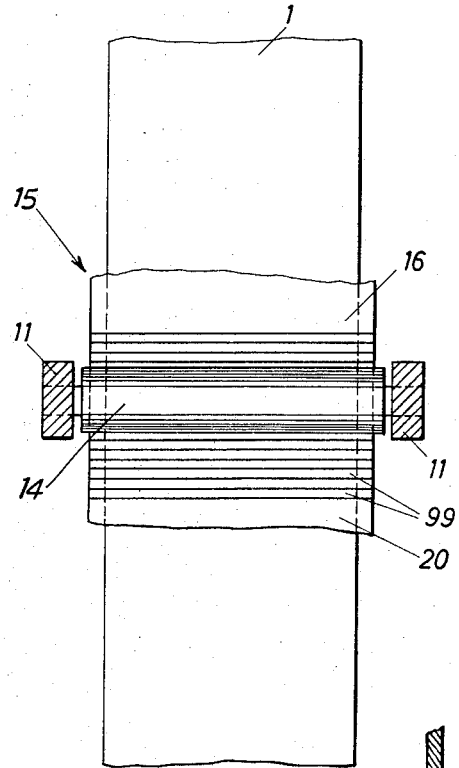
FIGURE 1A is a view taken along the line 1A—1A of FIGURE 1.

In FIGURE 1 there is shown diagrammatically a basic construction for a catch-brake according to the invention, it being shown applied for example to an elevating device. For reasons of clarity, FIGURE 1 shows for the elevator only those parts of the chassis thereof which is to be braked that are important for the operation of the catch-brake.

The catch-brake according to FIGURE 1 comprises two brake shoes 5 and 15 which during the braking operation come to bear upon oppositely disposed sides of a guide 1. The guide 1 may be at the same time a supporting and guiding column for the chassis but it is however possible also to provide a separate guide for the catch-brake which is preferably so shaped in cross-section that it will afford two opposed bearing surfaces for the two brake shoes 5 and 15. The two brake shoes 5 and 15 are arranged on a tiltable swingle 11 which comprises means for operatively interconnecting the brake shoes 5 and 15 and includes two links embracing the guide 1 at both sides, these links being interconnected at or near their ends by means of bolts 12 and 13. The brake shoe 5 is pivotally mounted on the bolt 12 whereas on the bolt 13 there is disposed a roller 14 which can roll in the longitudinal direction of the brake shoe 15 upon the side of the latter opposed to the braking surface 15b, this side being constructed of wedge shape and exhibiting two wedge faces 16 and 20 of different slopes. The wedge face 20 is less steeply inclined relative to the braking surface 15b and may be formed with grooves 99 which extend parallel with the axis of the roller 14. The grooves 99 serve to prevent undesired swinging movements of the swingle 11 relative to the brake shoe 15 during the braking operation. However, a sliding block may also be mounted on the bolt 13 instead of the roller 14 when it is also possible in case of need to provide grooves 99 and these either in the wedge face 20 or in that face of the sliding block which bears upon the brake shoe 15. In order to hold the brake shoe 15 in combination with the swingle 11, the roller 14 is guided in a closed loop 17 which forms a part of the brake shoe 15.

FIGURE 1 represents the catch-brake in the position of initiation of the braking operation. In normal conditions of operation, in which the catch-brake is inoperative, the swingle 11 is disposed substantially horizontally. It then rests under the action of its own weight by its end adjacent to the brake shoe 15 upon a stop 4 which is adjustable in height and is mounted on a part 95 of the chassis to be braked. In normal conditions of operation the brake shoe 15, under the action of its own weight or due to the influence of a relatively weak spring (not shown), is so far displaced with respect to the swingle 11 that the roller 14 is disposed at the upper end of the more strongly inclined wedge face 16. The arrangement can be so designed that in this condition the brake shoe 15 freely depends in the swingle 11, the position of the center of gravity of the brake shoe 15 being so chosen that the lower end of the latter will be at a greater distance from the guide 1 than the upper end thereof. The arrangement may however also be so designed that in normal conditions of operation the lower end of the brake shoe 15 rests in a bearing which suitably may be formed in the chassis part 95. For this purpose the lower end of the brake shoe 15 may be provided with a projection 96 which is received in a correspondingly shaped recess 97 in the chassis part 95. In any case, however, the arrangement is so designed that the braking surface 15b of the brake shoe 15 will be spaced from the guide 1 when the brake is in the normal inoperative position.

The second brake shoe 5 is connected with a part 2 of the chassis movable along the guide 1. At its end disposed adjacent to the chassis part 2 the brake shoe 5 exhibits a cone 7 which in the normal inoperative condition of the catch-brake rests in a corresponding conically formed recess 8 in the chassis part 2. The recess 8 is so arranged in relation to the guide 1 that the braking surface 5b of the brake shoe 5 will be at a desired distance from the adjacent surface of the guide 1 when the cone 7 is engaged in the recess. The connection of the brake shoe 5 with the chassis part 2 is effected, according to the invention, through the interposition of a spring 9 which in the present example is a compression spring although, with a corresponding re-arrangement, a tension spring may be employed. The conical end 7 of the brake shoe 15 is provided with a bolt 70 upon which the compression spring 9 is arranged between abutment discs 71 and 72. The disc 72 is pressed against a nut 73 screwed on the bolt 70 and by means of which the degree of pre-stressing of the spring 9 may be adjusted. The other disc 71, in the rest position of the catch brake, presses against a shoulder 10 formed on the bolt 70 which shoulder (in this position of the parts) projects by a distance b below the lower surface of the chassis part 2. In the operating condition of the catch-brake, which is shown in FIGURE 1, the disc 71 presses directly against the lower surface of the chassis part 2. The connection of brake shoe 5 to swingle 11 by bolt 12 and the arrangement of bolt 70 in disc 71 guide the brake shoe 5 for movement longitudinally of guide 1.

The braking operation is initiated when the chassis moves along the guide 1 at a speed which exceeds a predetermined value. A regulator 18 is provided the details of which will be described below and which responds to the relative speed between the chassis and column. In the case where the predetermined speed is exceeded, the regulator 18 acts upon a tension element 19 which in its turn draws the brake shoe 15 out of its rest position in a direction opposite to that in which the chassis is moving. There first occurs a movement of the brake shoe 15 relative to the swingle 11 during which the roller 14 rolls down the steeper wedge face 16 and, corresponding to the degree of inclination of this wedge face 16, moves the braking surface 15b of the brake shoe 15 against the adjacent braking surface on the guide 1 during an extremely short travel of the shoe. During this operation the swingle 11 begins to assume an inclined position. Upon further pulling of the brake shoe 15 the roller 14 rolls over the less steeply inclined wedge face 20. Thus the brake shoe 15 will be brought still closer to the guide 1 with a correspondingly increased normal force (that is the force component with which the braking surface of the brake shoe will be pressed vertically against the guide 1) until finally the braking surface 15b comes to bear upon the guide 1. The inclination of the swingle 11 increased during this operation so that the distance between the bolts 12 and 13, measured normally to the guide 1, continuously decreases. As also at the same time, due to the roller 14 running down the wedge faces 16 and 20 of the brake shoe 15, the swingle 11 will be pulled bodily somewhat in the direction towards the brake shoe 15, the brake shoe 5 also lifts from its seat 8 initially through the non-spring-loaded stroke b. Thus the brake shoe 5 will also be moved in the direction for applying its brake surface 5b against the opposed braking surface on the guide 1 until this brake surface 5b comes to bear on the guide 1. In this condition of the catch-brake there already exists a considerable friction between the two brake shoes 5 and 15 on the one hand and the guide 1 on the other hand. Furthermore a considerable force acts upon the swingle 11 in the direction for causing a further tilting of the swingle 11 about the bolt 13 since the brake shoe 15 is connected with the chassis to be braked. The normal force with which the two brake shoes 5 and 15 are pressed against the guide 1 will, therefore, be so strongly increased as to be almost impact-like so that a total self-jamming of the catch-brake will occur, that is to say both brake shoes will no longer move relative to the guide 1.

During this whole operation, which takes place during a relatively short travel of the braking shoes and thus also within a relatively short space of time, the chassis to be braked has remained in motion. Now that the brake shoes 5 and 15 are locked against movement relative to the guide 1, further motion of the chassis causes a compression of the pre-stressed spring 9 because the chassis part 2 now begins to move relative to the brake shoe 5 through the distance $h$. In this way there commences a transmission of the braking force (that is the force to be braked acting in the direction of the length of the guide 1) between the catch brake and the chassis. After a length of travel $h$ has been completed against the action of the pre-stressed spring 9, an abutment 3, which is also disposed on the chassis and therefore moves together with the chassis parts 2 and 95, comes to bear upon the upper edge of the brake shoe 15. Thus a force is transmitted to the brake shoe 15 which, whether it be because the brake shoe moves slightly relative to the roller 14 or because the swingle 11 adjusts itself to a slightly less inclined position, leads to a corresponding reduction in the normal force acting on the brake shoes. From this moment on there ensues within the catch brake system a self-regulating process which results in a state of equilibrium within the system, in which state the braking force (that is the force to be braked acting at right angles to the guide 1) becomes substantially dependent on the adjusted force of the spring 9 and substantially independent of the coefficient of friction between the brake shoes 5 and 15, on the one hand, and the corresponding bearing surfaces of the guide 1, on the other hand.

To explain this self-regulating process, it may first be stated that the frictional force between the braking surfaces of the brake shoes and the corresponding bearing surfaces of the guide can be represented with good approximation by the equation $$R = U.N$$

In this equation, R represents the frictional force, U the coefficient of friction and N the normal force. The frictional force R is to be so dimensioned in the usual manner that, depending upon whether only the speed of the chassis is to be reduced and/or the masses are to be braked to a standstill or the loads are to be held, it will be adjusted to be smaller than, equal to or greater than the braking force (force P to be braked). In general, in safety braking systems the frictional force R is at least equal to the braking force P. In the case of the brake according to the invention, the braking force is determined as to by far the major part by the force exerted by the spring 9 (original initial spring tension+additional compression of this spring, by the stroke height $h$), since by far the greater portion of the force transmitted from the chassis to the brake and which is to be braked is transmitted to the brake by way of the spring 9 and only a correspondingly small proportion (e.g. 20%) by way of the direct contact between the stop 3 and the brake shoe 15.

Let it be assumed that the frictional force R is reduced as a result of a change in the coefficient of friction U, for example because there is a particularly hard, smooth surface or some film consisting of a soft greasy material at the part of the guide in question or because the coefficient of friction diminishes owing to its known dependance on speed. This (if the normal force N is first imagined as being constant), causes the two brake shoes 5 and 15 to "slip" in an intensified manner with respect to the guide 1, mainly because of the described differing transmission of the braking force components to the two brake shoes—the brake shoe 5 somewhat more strongly than the brake shoe 15. The effect of this process is that the spring 9 reduces its stroke $h$ to a slight extent and the swingle 11 adjusts itself more obliquely by a corresponding amount. However, the normal force N which acts on the two brake shoes is thereby correspondingly increased, so that the reduction of the coefficient of friction is again compensated in a first approximation and, in spite of the reduction of the coefficient of friction, a substantially constant frictional force R is thereby produced. A similar process takes place in the reverse direction when the coefficient of friction U increases for any reason during the braking operation, for example as a consequence of irregularities, corrosion phenomena or the like on the guide 1. In this case, the spring 9 is further compressed, the swingle 11 adjusts itself about the pin 13 to a correspondingly smaller slope and the normal force N, which urges the brake shoes 5 and 15 against the column 1, becomes correspondingly smaller. In the result, on the other hand, the frictional force R remains substantially constant at a first approximation. The same also applies on the occurrence of other irregularities, for example any changes in the thickness of the guide 1.

As the frictional force R and the braking force P are pre-adjusted substantially in a specific ratio to one another (e.g. $R=P$), the brake according to the invention actually renders possible an action wherein not only the frictional force R, but also the braking force P, becomes substantially independent of changes in the coefficient of friction between the brake shoes and the guide and substantially only dependent on the adjusted force of the spring 9. On the adjustment of the force of the spring 9 to a specific braking force, the average spring stroke $h$ during the braking process is also advantageously taken into account, while the changes in the stroke height $h$ during the regulating process within the braking system can be disregarded because of their smallness. The constancy of the braking force P obtaining in a good approximation is maintained, from the start of the regulating process within the braking system, throughout the entire progress of the braking operation until (with appropriate proportioning of R and P) all the kinetic energies which are to be braked are dissipated in friction and all the masses which are to be braked have come to rest.

The brake according to the invention, however, not only supplies a constant braking force during the entire braking operation but also a suitably gentle and evenly commencing braking process because, from that moment when, owing to the additional compression of the spring 9 and the contact of the stop 3 with the brake shoe 15, a substantial transmission of the braking force to the brake takes place, the complete self-locking of the brake, which is important for the initiation of the regulating process, is terminated. The brake according to the invention thereby avoids the disadvantage of previous self-locking catch or safety brakes, which is that the braking operation takes place with a suddenly commencing and practically infinite or at least extraordinarily large frictional force which in certain circumstances may result in destruction or fractures which may even jeopardize the safety of the entire braking operation (e.g. when, owing to the sudden transmission of the entire energy to be braked to the stationary brake, the body which is to be braked detaches itself from the brake. Also important is the advantage which is obtained by means of the invention in those kinds of equipment which must be braked by means of two or more safety brakes on two or more guides. With a plurality of guides, it is in fact practically impossible to avoid the bearing or contact surfaces for the action of the brake shoes having somewhat different coefficients of friction, with the consequence that on the commencement of braking the braking distances at the individual guides are of different lengths. Thus, when previous catch or safety brakes are employed, an inclined position of the body which is to be braked may very easily result with considerable material damage both to the body itself and to the guides. In many cases, it may even happen that the catch brake leaves its guide and the body which is to be braked then falls.

Individual detail improvements could also be made in the safety brake shown in FIG. 1. For example, it is advantageous to provide the braking surfaces 5b and 15b with friction teeth 6 in the manner shown in FIG. 1. In FIG. 1, for reasons of simplification, only two such friction teeth are shown in each case, but in the practical case several such frictional teeth are preferably employed. The friction teeth 6 give an exceptionally favorable coefficient of friction, so that the brake shoes grip reliably. Further improvement is obtained by providing a bearing 94 on the swingle 11. In the inoperative state of the brake, this bearing receives the stop 4 fixed to the chassis and thereby fixes in addition the inoperative position of the swingle 11. Furthermore, there may also be provided on the chassis a displaceably mounted bolt 92 which is urged against the swingle 11 by a spring 93 when the swingle 11 is in the inclined position. Over and beyond the effect produced by the transverse grooves 99, the inclined position of the swingle 11 is thereby still further stabilised. Moreover, the entire brake may also be so arranged that the brake shoe 5 is designed as a wedge, corresponding to the brake shoe 15, which wedge is displaceably mounted in the swingle 11 and is connected to the chassis part 2 by way of a suitably arranged pre-tensioned spring.

FIG. 2 illustrates a somewhat improved brake which otherwise, however, operates on the same basic principle as has been expained above with reference to FIG. 1. Instead of the roller 14, which, in the example of FIG. 1, was mounted on the pin 13 of the swingle 11, in the example shown in FIG. 2 there is provided a two-armed lever 24 which is pivotally mounted on the pin 13 of the swingle 11. One end of this two-armed lever 24 is provided with a roller 25 which runs in the manner already described on the wedge-shaped surfaces 16 and 20 of the brake shoe 15. That end of the two-armed lever 24 which is remote from the roller is applied with friction teeth 6 against the facing surface of the guide 1 when a load is applied to the brake in proportion to the pivoting action about the pin 13 which is initiated by the roller running on the wedge-shaped surfaces 16 and 20. The special feature of the two-armed lever 24 is that, owing to the action thereof, the wedge-shaped brake shoe 15 is pressed somewhat less strongly against the guide 1 than in the example described above. The pressure or contact force can be pre-determined by suitable choice of the length of the lever. The advantage of the lower pressure is that the forces transmitted through the stop 3 to the brake shoe 15 also become smaller and the regulating influence of the pre-stressed spring 9 is thereby increased.

In this embodiment, the lever 24 may be of a two-part construction which is such that one lever arm rests on both sides of the roller 25 and one lever arm on both sides of the brake shoe 15.

At the lower end of the brake shoe 15, i.e. at that end which leads in the braking direction, a plurality of balls 26 is advantageously provided, said balls rolling under spring loading on the facing bearing surface of the guide 1 when the brake shoe 15 is located in the braking position. Each ball 26 is arranged in a bore in the brake shoe 15 and is prevented by means of a bearing, not shown in detail, from leaving the braking surface of the brake shoe 15. Within each bore there is a spring 27 which presses at one end against the ball 26 and is supported at the other end against a lockable set screw 28, so that the tension of the spring 27 is variable. Preferably, a plurality of balls 26 is distributed, disposed side by side, over the width of the brake shoe. The object of these balls is to carry out a preliminary cleaning action, for example a preliminary cleaning from lubricants or the like, owing to points contact on the associated bearing surface of the guide, so that during the braking process proper the friction teeth 6 coming after them act with an increased coefficient of friction. The pre-stressing of the balls 26 by means of the springs has the advantage that the guide 1 is not damaged by the balls 26. Instead of the balls 26, a number of correspondingly arranged and convexly rounded pins may also be provided for preliminary cleaning of the guide.

The brake shoe disposed opposite the wedge-shaped brake shoe 15 likewise differs in construction from the example shown in FIG. 1. A separate brake shoe 22 is mounted on the pin 12 and the pin 12 is connected by way of a fork 21 to the chassis part 2. The lower end of the fork is again provided with a cone 7 which, when the brake is out of engagement, rests in the corresponding conical recess 8 in the chassis part 2. The arrangement, mounting and design of the spring 9 corresponds to the constructional form already described with reference to FIGURE 1. The brake shoe 22 is pivotable relative to the fork 21. In order to keep the brake shoe 22 substantially vertical in the unloaded state of the brake, a stop 23 is provided on the brake shoe 22 and bears against the facing edge of the fork 21.

Instead of the friction teeth 6 illustrated in the foregoing examples, balls may be arranged on those surfaces of the brake shoes which face the guide but in that case, of course, these must be mounted so that they are undisplaceable with respect to the brake shoe. Such balls likewise provide an extremely favorable coefficient of friction so that the brake shoe grips reliably. On the other hand, they prevent too fierce an action such as may be exerted, in certain circumstances, by the very pointed friction teeth 6. Moreover, any other desired or usual brake linings may be used on the individual braking surfaces of the brake shoes.

In FIG. 3 there is shown a brake according to the invention in which, in order to increase the braking action, several brake shoes 29a, 29b, 29c and 74 and 75 are provided on both sides of the guide 1. Consecutive brake shoes on opposite sides of the column are interconnected by means of respective links 76a, 76b, 76c and 76d. The brake shoes 29a, 29b, and 29c may take the form of simple rectangular shoes. The brake shoe 74, which initiates the braking process, is advantageously constructed as a wedge, similarly to the brake shoe 15 of the previously described examples, although in the example shown in FIG. 3 a continuous wedge surface with a constant slope is chosen. The lower brake shoe 75 corresponds in construction and method of operation to the brake shoe 22 of the embodiment according to FIG. 2. Connection of the brake shoe 75 to the chassis part 2 is again effected with the interposition of a spring 9. This spring is supported at one of its ends on the plane surface of a spherical segment 30 which, in turn, bears under the pressure of the spring against a bearing cup of corresponding spherical form in the chassis part 2'. This design of the bearing permits tilting movements of the fork 21' carrying the brake shoe 75, so that the brake shoe 75 can bear against the guide 1 without there being provision for that non-spring-loaded stroke distance b which is made in the preceding examples for the brake shoe mounted on the chassis.

The brake shoes of the construction shown in FIG. 3 may be provided with friction teeth but the example illustrated in FIG. 3 also operates extremely elastically even when there are no friction teeth and with a variable and low coefficient of friction. It is advantageous to provide the uppermost brake shoe 29a with friction teeth 6 arranged at one end, which teeth, on commencement of the braking operation, cause a tilting of the brake shoe 29a about its bearing on the rocker arm 76b. The result of this is that the braking loads in the brake shoes located higher up are already extremely high on commencement of the braking operation. An action of the safety brake which is substantially independent of the coefficient of friction—as stated in connection with the safety brake according to FIG. 1—is also set up in the case of the embodiment of FIG. 3 by the co-operation of the spring 9 with the stop 3.

In the construction illustrated in FIG. 3, the rocker arms 76a to 76d may consist of bend-resistant bars extending on one side of the guide and from which the pins for mounting the brake shoes 29a to 29c and 74 and 75 emerge in U-form. The same constructional form of the rocker arm may also be provided in the examples shown in FIGS. 1 and 2. On the other hand, in cases where the guide 1 consists of a rectangular or square or similarly shaped column or pillar, an arrangement of the rocker arms on both sides of the column is to be preferred. Moreover, in the case of FIG. 3, stops (not shown) are also to be provided on the individual rocker arms, said stops preventing the rocker arms dropping one within the other in the inoperative state of the safety brake and possibly jamming in so doing.

Figure 4:
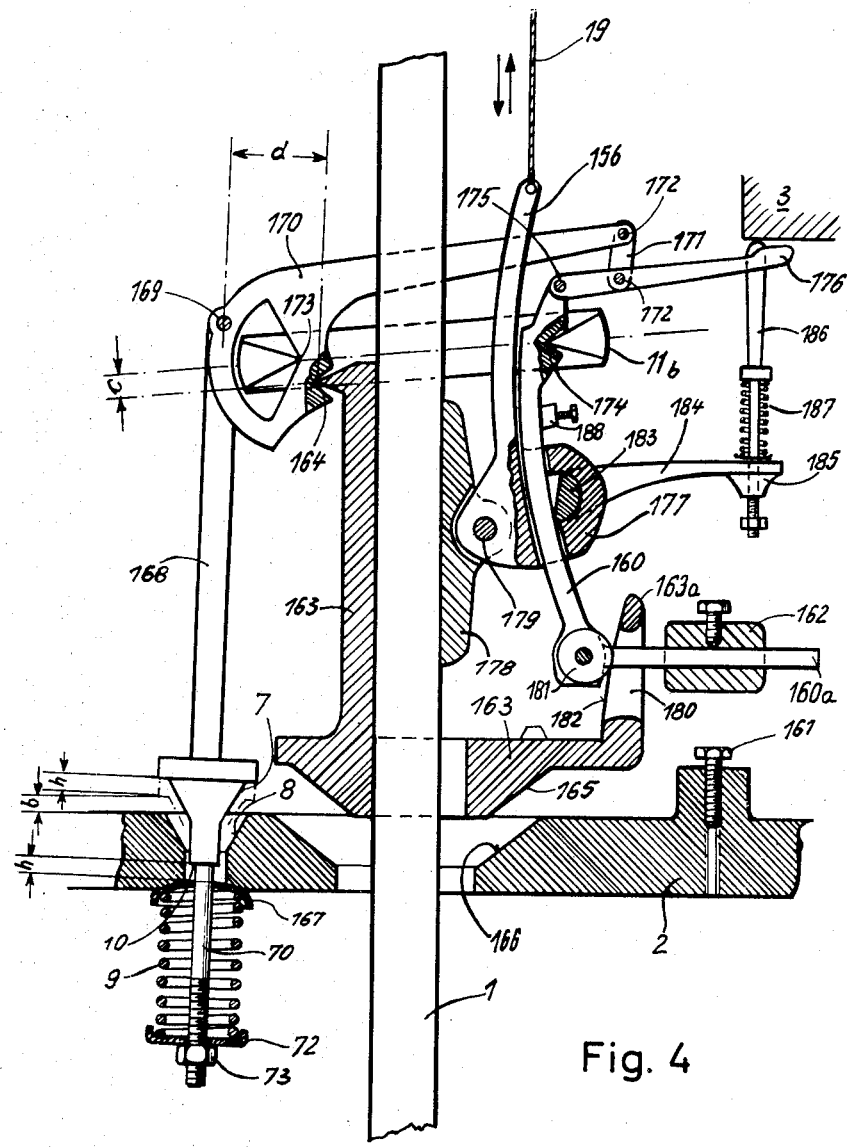
FIGURE 4 shows a fourth example.

FIGURE 4 shows a construction of the brake according to the invention which takes particular account of variable thicknesses of the guides. The brake described with reference to FIGURES 1 to 3 can only compensate to a limited degree for variations in the thicknesses of the guides and therefore necessitates relatively precisely constructed guides. It is however of importance in practice to be able to operate as far as possible with imprecise non-worked guides. The example shown in FIGURE 4 makes this possible. It is analogous in its manner of operation, although having a somewhat modified construction, to the form according to FIGURES 1–3 but, however, differs from this in that the pre-stressed spring 9 regulating the braking force does not work directly upon the brake shoe 163 (corresponding to the brake shoe 5 of FIGURE 1) but upon a converting linkage.

FIGURE 4 shows the brake in the initiated state. In the rest condition, that is to say when the braking operation has not been initiated, the guide lever 160 and the brake shoe carrier 156 (with the brake shoe 178 articulated thereto by way of the shaft 179) rests upon an extension 163a of the second brake shoe 163 which embraces the guide 1. The carrier 156 is slidably mounted, by means of the guide 177, on the lever 160 which has a projection 160a extending through a longitudinal slot 180 formed in the extension 163a and bearing upon the lower edge of this slot. On the extension 160a is adjustably secured a counterweight 162 which ensures that in the inoperative or normal condition the shoe 178 does not contact the guide 1. The weight 162 rests upon an adjusting screw 161 arranged on the chassis part 2. The brake shoe 163 is provided at its lower side with a seating surface 165 which in the inoperative condition of the brake so rests in a corresponding seat 166 in the chassis part 2 so that the shoe 163 will also be spaced from the guide 1. In a further conical seat 8 on the chassis part 2 rests a tension rod provided with a corresponding seat 7, with which rod the regulating spring 9 engages in the manner already described with reference to FIGURES 1 to 3. The spring 9 bears, at one end, against a disc 72 which in turn bears against an adjusting nut 73 screwed on the lower end 70 of the tension rod and, at the other end, against a disc 167. The disc 167 is somewhat dished and in the normal condition of the brake bears against the shoulder 10 beneath the guide 7 while in the braking condition it bears against a seat in the chassis part 2 which has been curved correspondingly with the disc. In the normal condition the tension rod 168 has free play by an amount b. The tension rod 168 is articulated at its upper end by way of a pivot 169 to a lever 170 which acts both through a knife edge bearing 173 upon the swingle 11b and also through a further knife edge bearing 164 upon the upper end of the brake shoe 163. The knife edge bearings are spaced from each other vertically by a distance c and the knife edge bearing 164 is at a distance d from the pivot 169, as indicated in FIGURE 4. The lever 170 passes around the guide 1 in the same manner as the extension 163a of the brake shoe 163 and carries at its outer end a further pivot 172 on which is articulated a lever 171. The lever 171 is articulated at its other end on a pivot 172′ between the ends of a further lever 176 which is articulated at the point 175 on the guide lever 160. The free end of the lever 176 is unloaded (in the normal condition of the brake). The swingle 11b, which also embraces the guide 1, is supported by a further knife edge bearing 174 on the guide lever 160.

As soon now as an initiating tensile force acts upon the tension element 19 connected with the carrier 156, the carrier 156 with the brake shoe 178 will be lifted and thereby moved towards the guide 1 by means of the guide lever 160.

As soon as the brake shoe 178 contacts the guide 1 the brake shoe 163 will also be brought against the guide 1 and, corresponding to the inclination of the lever 160, after a relatively short travel. The frictional force between the carrier 156 and the lever 160 is sufficient to lift the lever 160 and thereby to lift the swingle 11b. The roller 181 on the lower end of the lever 160 rolls along a curved guide surface 182 formed on the extension 163a and thus moves away from the guide 1. The initially horizontally disposed swingle 11b now assumes an inclined position. The lever 170 turns about the knife edge bearing 164 and at the same time the tension rod 168 lifts through the distance b. In this condition of the brake, the normal forces between the brake shoes and the guide 1 progressively increase until, as was the case in the preceding examples, total self-jamming or self-locking occurs. The force of the spring 9 is transmitted to the brake shoe 163 to a degree which has been increased in the conversion ratio d:c. It acts at the same time by way of the swingle 11b and the knife edge bearing 174 upon the lever 160. As the lower end of the lever 160 bears upon the guide surface 182 (through the roller 181) there results a "birdcage," formed by the brake shoe 163 with extension 163a, swingle 11b and guide lever 160, within which the second brake shoe 178 is tiltably articulated. This arrangement is extraordinarily robust and stable and at the same time very certain in its action. The guide surface 182 has to be so dimensioned that even when the swingle 11b is inclined there will always be a firm application of the lever 160 against the knife edge bearing 174 and also against the guide surface 182.

As soon as the spring 9 has completed the stroke h, the lever 176 is contacted by the abutment 3 with a force which amounts to only a fraction of the force of the spring 9. (The abutment 3 is a fixed portion of the chassis as in the preceding examples.) Up to this point absolute self-jamming of the brake shoes is obtained. The force transmitted by the abutment 3 now, by way of the linkage 176, 171 and 170, reduces the normal force acting upon the brake shoes 163 and 178 to such an extent that the shoes commence to slide along the guide 1 with a frictional force which remains substantially constant in accordance with the regulating operation already described in detail in connection with FIGURE 1.

Should a substantial thickening of the guide now be encountered the shoes are pressed apart. Consequently, the force transmitted to the lever 176 by the abutment 3 is reduced. Hereupon the normal force acting on the brake shoes is again increased so that the spring 9 is compressed somewhat and the force transmitted by the abutment 3 to the lever 176 is again increased and the spring stroke h will be increased. The whole brake assembly has therefore, by reason of the thickening of the guide 1, displaced itself through a small distance upwardly so that the total frictional force has also increased slightly. Upon passing the thickening of the guide, the normal force between the brake shoes and the guide 1 and, therefore, the frictional force, will again decrease, the spring stroke $h$ will be correspondingly reduced, the lever 170 will turn back somewhat and the brake shoe 163 will again move through a small distance towards the chassis part 2 so that the original condition of the brake assembly will be restored. The regulation is therefore effected in such manner that for a thickening of the guide 1 the spring stroke $h$ will be somewhat larger and for a thinning of the guide 1 it will be somewhat smaller. The inaccuracy in the regulation of the braking force thereby introduced is very small. The braking forces therefore remain substantially independent of the coefficient of friction and, moreover, are stronger than in the case of the constructions according to FIGURES 1 to 3 which permit only small variations in dimensions of the guide 1 and are insensitive to these.

Now if the chassis part 2 has been brought to rest by the brake, substantially the whole weight rests upon the spring 9 and only a very small part of it upon the lever 176. Should the chassis now commence to move in the opposite direction, the spring stroke $h$ diminishes to zero, the lever 176 leaves the abutment 3, the tension rod 168 descends further by the stroke $b$ and sets itself in its guide seating and both brake shoes return to their normal positions in which they are spaced from the guide 1. Thus the brake returns to the initial condition and is ready for a further braking operation without servicing.

It is convenient to arrange that the carrier 156 will no longer slide upon the guide lever 160 but will be arrested in its position during the regulation procedure. For this purpose a clamping arrangement such as shown in FIGURE 4 is suitable. After the brake assembly has lifted, the striker 186 approaches the abutment 3. This striker is connected by way of the lever 184 with the eccentric cam 183. Upon further lifting of the assembly the prestressed spring 187 is compressed, this spring bearing upon the bearing eye 185 on the level 184. This spring force, acting through the lever 184 and cam 183, firmly clamps the carrier 156 and the guide lever 160 together into a rigid unit so that, during the regulation procedure, there can be no relative movement between these parts. The contacting faces on the parts 156 and 160 as also on the cam 183 may be formed with flat-sided teeth in order to increase the locking action.

Figure 5:
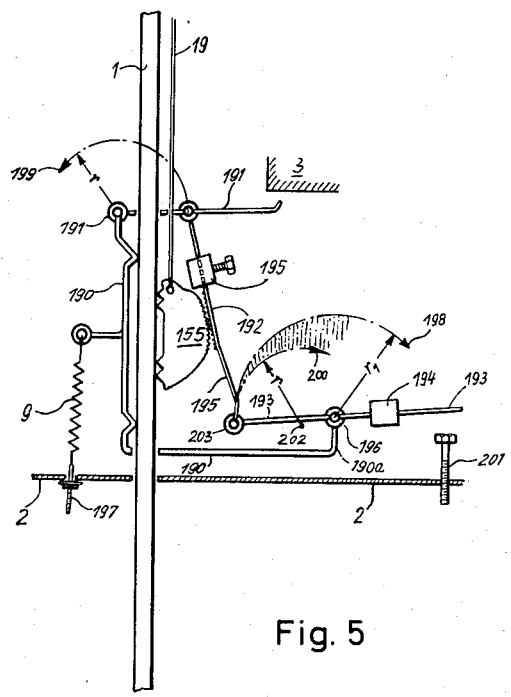
FIGURE 5 shows another example.

FIGURE 5 shows diagrammatically a brake according to the invention which is constructed similarly to that of FIG. 4 but employs a pivoted lever 193 instead of the guide surface 182 so that the advantage of reduced friction may be secured.

In the braking operation the brake shoe 155 is brought against the guide 1 after a short travel along the track 192. Subsequently the shoe 155 produces self-jamming in the region of the track 192. A stop 195 on the track 192 ensures that if an excessive initiating pull is applied through the tension element 19 to the shoe 155, no excessive wedging can occur. The stop 195 moreover ensures that during the regulating operation, when the brake has been operated, the shoe 155 will not creep upwardly. Flat-sided teeth, a frictional coating or similar means prevent the shoe 155 from slipping downwards.

On the upper part of the second brake shoe 190 is articulated the swingle 191 which, at a distance $r$ from its pivotal point, pivotally carries the upper end of the track 192. The lower end of this track 192 is articulated at 203 to a tilting lever 193 which is pivotally mounted, at a distance $r_1$ from this pivotal point 203, at the joint 196 on the extension 190$a$ of the brake shoe 190. Beyond the joint 196 the lever 193 carries a balance weight 194. When the shoe 155 is engaged with the center of the track 192, should the pivot 203 be rotated at a radius $r$ about the point 202 there would arise, due to the swinging of the pivot of 191 with 192 and of the pivot 203, arcs of a circle indicated by the arrows 199 and 200, respectively; there would thus be no further pressing of the shoe 155 against the guide 1. The center of rotation of the tilting lever 193, however, does not lie at the point 202 but at the joint 196. The difference between the radii $r_1$ and $r$ produces the "wedge effect" by which the shoes are further pressed against the guide. Suitably this difference is so determined that the force with which the shoes are pressed on increases approximately linearly with the inclination of the swingle 191.

The regulating spring 9, pre-tensioned by means of the nut 197, works exactly as in FIGURES 1 and 2. The regulating action between the chassis parts 2 and 3 is effected as in FIGURES 1 to 3. Should the brake be overloaded by counter-motion, the lever 193 strikes against the adjusting screw 201 and thereby releases the brake.

Figure 6:
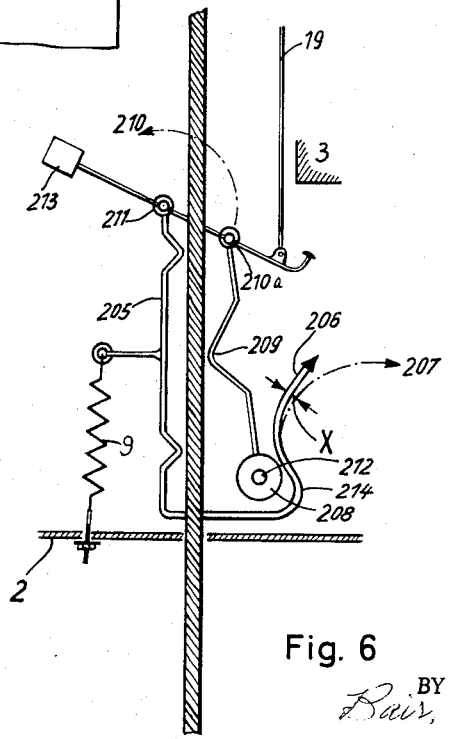
FIGURE 6 shows yet another example.

In FIGURE 6 is shown a further modification of the invention. On the extension of the brake shoe 205 is disposed the cam 206 upon which runs the roller 208. The brake shoe lever 209 is articulated at 210$a$ on the swingle 203 which in turn is pivoted at 211 on the brake shoe 205. The lower end of the brake shoe lever 209 is pivotally connected with the roller 208 at 212.

If, in the breaking operation, the roller were to roll over the cam 207, the brake projections on the brake shoe lever 209 would only take up the spacing between the shoes but would exert no "wedge effect" on the shoes. The brake shoe surfaces would be guided closely parallel to the rail. The distance X between the cams 206 and 207 produces the supplementary applying force that is due to the "wedge effect." It will be seen that the cam 206 has a comparatively long approximately linear portion over which the dimension X and thus the applying force for the shoes may be varied to the extent which is necessary for regulation. The counter-weight 213 serves for balancing the swingle so that the initiating force in the tension element 19 need not be large. The regulation procedure between the chassis elements 2 and 3 remains the same as in FIGURES 1 to 3. Instead of the projections on the brake shoe lever 209 there may also be employed an articulated shoe which applies itself flatly to the guide as in the other examples described above.

Figure 7:
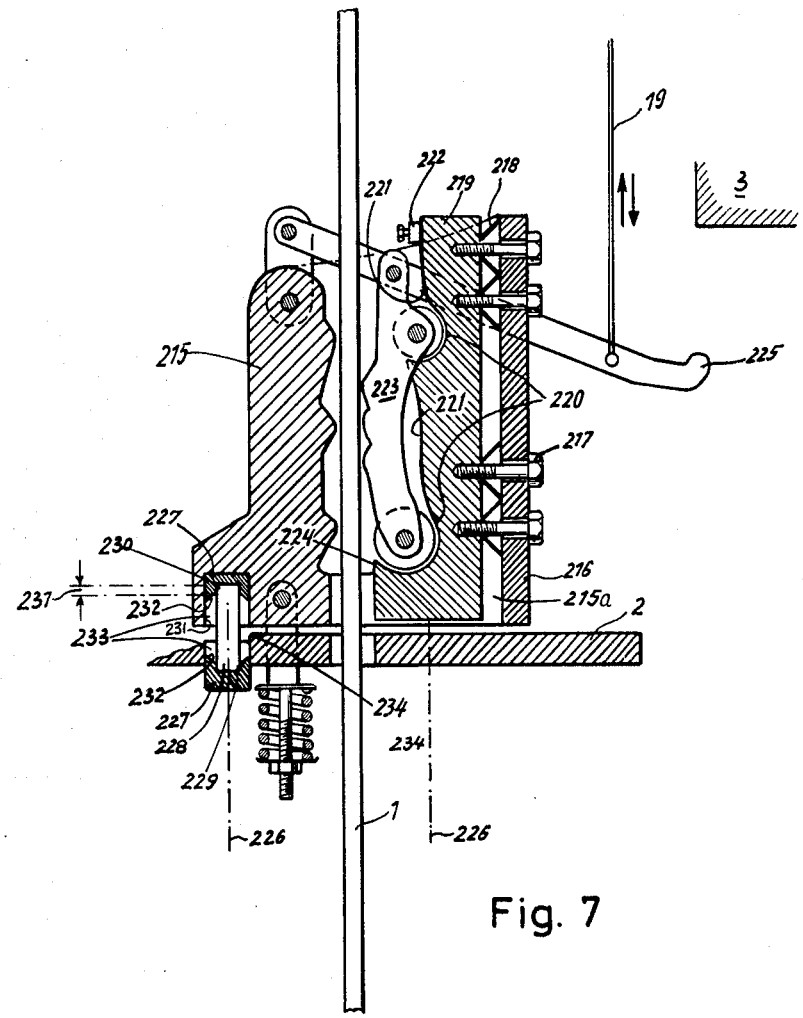
FIGURE 7 shows a further example.

In the example according to FIGURE 7, the carrier 216 is disposed on the extension 215$a$ of the brake shoe 215 and carries the cam body 219 by means of screws 217 and interposed disc springs 218. The springs 218 are so pre-stressed that their total force corresponds to that force which will still produce the necessary braking force with the smallest imaginable coefficient of friction. Upon initiation of the braking operation, a short displacement of the cam surfaces 220 on the body 219 causes the taking up of the spacing normally present between the brake shoes and the guide 1. The cam surfaces 221 produce the desired linearly increasing shoe-applying force. For the limitation of the maximum applying force a stop 222 is adjustably arranged on the cam body. The initiating brake shoe 223, when in the normal position, is supported by means of two rollers in the recesses 224 of the body 219 and when it is drawn into the braking position by actuation of the element 19 and through the tipping of the lever 225, these rollers rolls along the cam surfaces on the body 219.

Tipping wells 227 are secured symmetrically one above the other, one in the chassis part 2 and one in the brake shoe 215. In the wells stands a tipping plate 228 having the diagonally opposite corners 229 and 230. In the wells 227 are cut diametral slits of a width slightly greater than the thickness of the plate 228, these slits having their medial planes in the plane of the drawing and the one surface of each slit being marked 233. The depth of the plain portion 231 of the recess in each well 227 is such as to ensure the guiding and the stable supporting of the brake shoe upon the chassis. The inclined ends 232 of the slits ensure the easy reintroduction of the plate into the plain portions of the recesses when the brake asembly has lifted with lateral displacement and later has again descended. The lateral displacement is limited by the fact that the plate 228 comes to bear upon the edge 234. However, the corner 230 then still does not stand vertically above the corner 229. When the brake assembly descends, that is to say when there are no longer any lateral forces acting upon the assembly, the corner 230 of the plate slides down the incline 232 so that, finally, the normal position indicated at 226 will again be reached. This method of guiding the brake frame is particularly well suited on account of the frictionless manner of operation, the small forces to be contained and its robust simplicity.

The regulating procedure goes on (by way of the pre-stressed spring 9 and the abutment 3) in a similar manner to that in the examples previously described.

Figure 8:
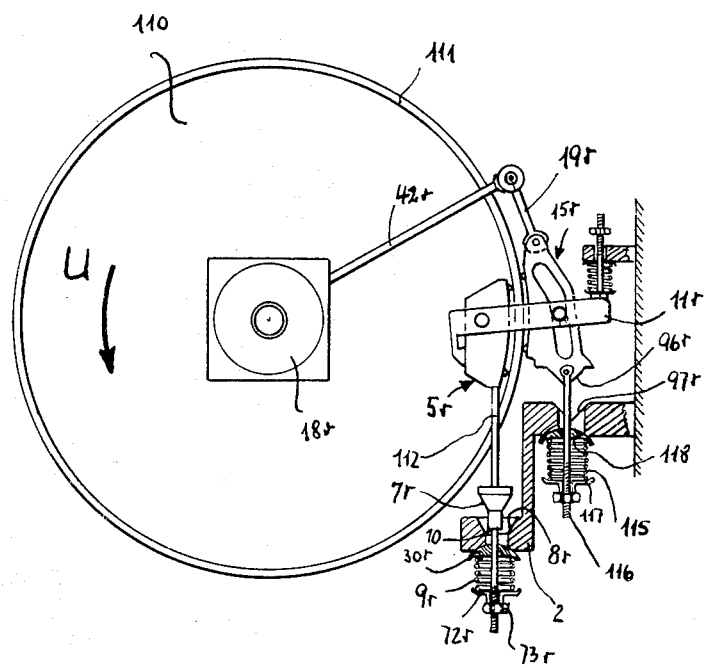
FIGURE 8 shows a modified construction of the catch-brake according to the invention.

FIG. 8 shows the application of the catch or safety brake according to the invention to the case of the braking of a rotating body 110. In this case, the entire braking system is arranged to be stationary, while the body 110 or a pheripheral tire or rim 111 mounted on said body forms a braking rail moving relatively to the stationary brake. In the view of FIG. 8, it assumed the body 110 is rotating in the direction indicated by arrow U. Moreover, in the view of FIG. 8 there are shown only those parts which perform the functions that have already been described with reference to FIGS. 1 to 3. For this reason, the reference numerals already employed in FIGS. 1 to 3 have been used in FIG. 8 but with the addition of the suffix "r". The regulator 18 responds to the speed of rotation of the body 110. It acts by way of a linkage 42r and a tension element 19r on the wedge-shaped brake shoe 15r which, in the present example, is of course provided with a braking surface curved in accordance with the curvature of the rim 111. The brake shoe 15r is displaceably mounted in a swingle 11r and on its lower end there acts a spring 115 which performs the function of the stop 3 provided in the examples shown in FIGS. 1 to 3. The pre-stressing of the spring 115 is adjustable by means of a nut 116 which acts on a disc 117. The spring 115 bears at one end against the disc 117 and at the other end against a bearing 118 in the shape of a spherical segment. In the inoperative state, the brake shoe 15r rests by means of a projection 96r in a stationary recess 97r.

The other brake shoe 5r, which is mounted in the swingle 11r, is subjected to the pressure of a suitably strongly pre-stressed spring 9r when it is in the operative state. The spring 9r bears at one end against a disc 72r and at the other end against a bearing 30r in the shape of a spherical segment. Its degree of pre-stressing is adjustable by means of a nut 73r. To the brake shoe 5r there is attached, for example by way of a rigid connecting rod 112, a cone 7r which, in the inoperative state of the brake, rests in a corresponding stationary conical seat 8r. The mode of operation of the brake described so far functionally corresponds to that of the brake already described with reference to FIGS. 1 to 3 and therefore need not again be explained here.

It has already been mentioned that in all the constructional forms of the brake according to the invention the initiation of the braking action is effected by a tensile force which is transmitted by way of the tension element 19 to the wedge-shaped brake shoe which is not connected to the chassis. This tensile force may be produced in various ways, depending on the parameter to which the brake concerned is to respond. Fundamentally, there are the following possibilities:

A. Rendering the brake operative by means of stops which are located in predetermined end positions of the moving body.

B. Rendering the brake operative by means of acceleration forces which become effective on a sudden acceleration of the moving body (see example of FIG. 20).

C. Rendering the brake operative by means of a regulator responding to the speed of the moving body (see examples of FIGS. 1 and 2 and also the examples of FIGS. 24 and 25).

D. Rendering the brake operative in dependence on force (e.g. if the cable breaks or on overload), for example by means of a rocker on one end of which the force to be taken into account acts and which, on a change in this force, executes a corresponding tilting motion.

There will first be described the rendering operative of the brake by means of a speed-sensitive regulator such as has already been indicated in principle in the form of the regulator 18 in the case of the constructional examples according to FIGS. 1 and 2. A particularly suitably constructional form of such a regulator is described more fully with reference to FIGS. 9 to 18 (19).

The speed regulator is mounted on the moving body. A driving wheel 31 of the regulator is driven in proportion to the speed of movement of the body. For example, the driving wheel 31 can run down the guide 1 with the body.

In this case, the periphery of the driving wheel is advantageously provided with teeth or some other frictional covering which ensures reliable rotary entrainment of the driving wheel during the movements of the body. The use of teeth is to be preferred if there is a possibility of so placing the regulator that the teeth will always strike the same points on the guide 1 and in this process "dig themselves in" somewhat into the (softer) guide 1, so that a kind of rack-and-pinion drive is formed. It is also possible, however, as shown in FIG. 11, to rotate the driving wheel 31 by an external drive in proportion to the speed of movement of the body. In this case, the drive can be carried out by means of an independent rack, the drive of which is transmitted (with or without freewheeling in one direction) to the shaft 34 of the driving wheel by way of a coupling 76.

There are arranged on the shaft 34, one on each side of the driving wheel 31, cam discs 32 having radial elevated portions or projections and ratchet wheels 33, which all rotate with the driving wheel 31. The shaft 34 with the wheels mounted thereon is rotatably arranged in an angular forked guide 35. The offset limbs of the forked guide 35 have a U-profile in cross-section in each case. The complete speed regulator is connected by way of a resilient rocker arm 36 to the moving body. The point of connection (FIG. 9) is such that the rocker arm 36 is mounted to oscillate on a fixed ball or a fitted bolt, so that the axis of the shaft 34 can move along the arc of a circle J-K.

The contact pressure of the driving wheel 31 on the guide 1 is produced by means of a spring 77 which bears against the outer end of the horizontal limb of the forked guide 35 and urges the entire arrangement elastically in the direction C against the guide 1. Owing to the possibility of oscillation about the point 37, the spring 77 determines the bearing pressure of the driving wheel 31 on the guide 1.

A respective jumping wheel 40 mounted on a rockable arm 71 runs on the periphery of each of the cam discs 32, which are of polygonal shape. Each arm 71 is mounted in turn on an axle 43 in a U-shaped carrier 41. The lower ends of the U-shaped carrier 41 are pivotally mounted on the shaft 34 of the driving wheel 31. The carrier 41 is held in a vertical position, for example by means of a relatively weak spring force or by means of a weight carried on the lever 42 which weight may be constituted by the initiating brake shoe itself. On the axle 43 there is moreover mounted in each instance a pawl 38 which is off-set axially to such an extent with respect to the corresponding jumping wheel that it is located above the respective ratchet wheel 33. Each pawl is so coupled with the associated jumping wheel or its rockable arm that an upward angular movement of the jumping wheel causes a downward movement of the pawl 38.

The weight of the jumping wheel 40 and of the rockable arm 71 is so calculated that, in co-operation with a balance weight 39, which is likewise arranged on the axle 43 as an extension of the rockable arm 71 to the opposite side of the jumping wheel 40, when a certain critical speed of rotation of the driving wheel 31 or of the shaft 34 and thereby of the cam disc 32 is reached, the jumping wheel 40 undergoes a radial deflection which causes engagement of the pawl 38 with the ratchet wheel 33. The entire U-shaped carrier is then swung in the direction indicated by the arrow E on the shaft 34 (FIG. 10) by the rotating ratchet wheel by way of the engaged pawl and, owing to this swinging movement, renders the brake operative by way of an actuating linkage 42 and the tension element 19 already mentioned above. The actuating linkage 42 is rigidly connected in a suitable manner to the carrier 41 (see also FIG. 11).

The symmetrical arrangement of the cam discs 32 and ratchet wheels 33 in pairs on both sides of the driving wheel 31 has the advantage of a double security and a shorter response time when the predetermined speed is exceeded. Advantageously, the two cam discs are so staggered with respect to one another in the peripheral direction that the points of maximum radius of one cam disc are located opposite the points of minimum radius of the other cam disc.

FIG. 10 shows the maximum deflection of the carrier 41 and of the linkage 42 attached thereto. The angle of deflection G of the carrier 41 can be increased by arranging the carrier within the fork 35, so that it can swing through 180°. The tilted position of the support is produced by the displacement of the regulator in the direction A to B (FIG. 9).

In the design of the speed regulator according to the invention special care must be taken to ensure a sensitive response to a certain pre-selected critical speed of the moving body. FIGS. 11 to 18 show in detail the measures provided according to the invention for obtaining the desired sensitivity. In principle, the proposal according to the invention is to the effect that there be employed, instead of the axles of large cross-section which have heretofore been customarily employed together with very thin trouble-susceptible springs, very thin axles 43 which are mounted with low friction in durable grease. The rockable arm 71 of the jumping wheel 40 with the pawl 38 and the balance mass or weight 39 are mounted on a bearing body 38' which is secured on the thin axle 43. The clamping action between the bearing body 38' and the axle 43 can be adjusted by means of a screw 44 which presses an element 45 of inelastic material against the axle 43. The outwardly directed end of the axle 43 is carried through the facing wall of the carrier 41 and connected to the end of a volute spring 47 mounted in a housing 48. The volute spring is shown in detail in FIG. 12 in which the form taken by the point of connection between the end of the axle 43 and the end of the volute spring 47 is shown clearly. The end of the axle 43 is provided with an extension 78 which projects into a correspondingly formed slot in a spring core 46 connected to the end of the volute spring. The outer end of the volute spring 47 is secured with regulatable pre-stressing in a housing 48 surrounding the spring and carried on the carrier 41 so that the jumping wheel while it is running on the cam disc will be applied to its periphery under a predetermined adjustable pressure. By means of the volute spring, the critical speed at which the radial deflection of the jumping wheel 40 causes the pawl 38 to engage is adjusted.

Advantageously, the axle 43 does not extend over the entire width of the carrier 41, but is divided in the middle, the adjacent ends of the halves of the axle 43 terminating at a pin 51. The two ends of the respective half axles 43 are supported in bearing bodies 52 and 79, respectively. The bearing body 79 is secured in the wall of the carrier 41 while for the centrally located bearing body 52 there is provided a special mounting 80 which is detachably connected to the support 41 at an adjustable distance therefrom (e.g. by means of spacer discs 80d). The ends of the bearing bodies 52 and 79 are formed in each case with turned recesses 49 and 49', respectively, which permit a radial deflection of the flexible axle 43. Such a deflection of the axle 43 occurs basically on engagement of the pawl, when the entire carrier 41 is swung on the shaft 34. The radial deformations of the axle 43 are of course within the elastic range. In order to prevent excessive deformation, the axial ends of the bearing body 38' are likewise formed with turned recesses 50 and 50' which surround the ends of the bodies 52 and 79 with a clearance. The maximum lateral deformation of the axle 43 is determined by the abutment of the ends of the the bearing bodies 52 and 79 against the inner surface of the turned recesses 50 and 50' (see FIGS. 16 and 17). The turned recesses 49 and 49' in the bearing bodies 52 and 79 may also have other cross-sectional shapes, for example conical or with a curved wall, as shown in detail in the example of FIG. 17.

In order likewise to obtain the radial deformation desired for the elastic shock absorption in the case of very short axles or axles of larger cross-section, one section of the axle may take the form of a spring. In the example illustrated in FIG. 17, that section of the axle 43' which is located in the bearing body 38' takes the form of a spring 80'. The result obtained by means of this spring section 80' is that the lateral deflection of the axle 43' remains within the elastic range even with larger cross-sections or with a fairly small longitudinal dimension of the axle. The other structural parts of the example shown in FIG. 17 are designed like those previously described. A further possibility of constructing the axle 43' is illustrated diagrammatically in FIG. 18. In order to obtain a rectilinear section 81 for guiding the axle in the region of the bearing body 38', two spiral spring sections 82 and 83 arranged at a distance from one another are provided, the engagement with the bearing body 38 being provided in the region 81 between these spirals.

Figure 19:
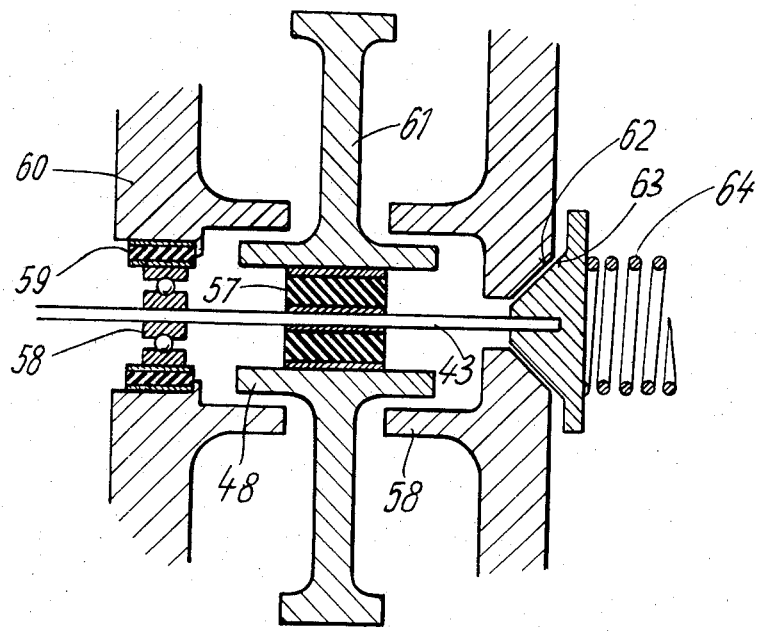
FIGURE 19 shows another application of the principle of the speed regulator according to the invention.

According to a further proposal, elastically deformable axles of this kind having a small cross-section can also be employed generally as a new mechanical element for rotating wheels. In the example of application shown in FIG. 19, an elastic bush 57 is secured on the axle 43 and rigidly secured to a rotary body 61. On overloading of the rotary body 61, there occurs a radial deformation of the axle 43, in opposition to the spring action of the elastic body 57, until the hub 84 of the rotary body bears on one side against a bearing body 85 surrounding the hub with a clearance. The desired result can also be obtained with the combination of a ball or plain bearing 58 with an elastic bush 59 in a housing 60. At the same time, for the purpose of centering the axle 43 exactly, there may be provided on the end thereof a bearing plate comprising a cone 63 which is guided in a conical recess under loading by the spring 64.

FIG. 20 shows diagrammatically how a brake according to the invention may be rendered operative by acceleration forces. This method of rendering the brake operative has special importance in the case of complete breakage of a cable. A weight Q is mounted on the chassis part 2 of the cage so as to be vertically displaceable against the pressure of a spring 53. The weight Q is carried by a piston rod 86 which is guided in a damping pot 54. The weight Q is connected by way of an actuating linkage 55, 56 to a wedge-shaped brake shoe which may be designed as in the examples described above or, as shown in FIG. 20, may also be a double wedge 87. The double wedge renders possible the initiation of the braking operation when a certain speed is exceeded independently of the direction of movement. The brake shoe 87' located opposite the wedge-shaped brake shoe 87 is held by springs 9 which have the same function as the spring 9 described in connection with FIGS. 1, 2 and 3.

The weight Q is supported by the spring 53. When there is a sudden increase in speed, the load acting on the spring owing to the weight is reduced owing to the decrease in the force of attraction, so that the spring is either compressed or extended. On downward travel at high speed, the spring 53 is extended with respect of the normal position and on excessively accelerated upward travel an increased compression of the spring 53 occurs. The relative movements of the weight Q with respect to the chassis part 2 resulting therefrom are transmitted to the wedge-shaped brake shoe 87, so that the latter causes the brake to engage either through upward movement or through downward movement.

An embodiment is described with reference to FIGS. 21 to 23 in which a moving body (which is not shown as such) runs along two parallel guides (which are likewise not shown), each of the two guides having associated with it a separate brake controlled independently of the other brake. The provision of two independent brakes which, naturally, affords a high degree of safety, is advantageous in particular in high-speed lifts or elevators. The proposal illustrated in FIGS. 21 to 23 increases the safety of such an arrangement additionally by a mechanical coupling of the two brakes by way of the wedge-shaped brake shoes 15 (which are the only parts of the brake according to the invention shown in FIGS. 21 to 23).

In FIGS. 21 to 23 it can be seen that the two brake shoes 15 and 15a controlled independently of one another are mechanically coupled to one another by way of a crank connection. In elongated extensions 100 and 100a of the two brakes 15 and 15a, respectively, there are slots 91 and 91a respectively. Pins 88 and 88a engage one in each of the two slots and are secured to rocking levers 90 and 90a, respectively. The two rocking levers 90 and 90a are rigidly interconnected by way of a torsion-resistant shaft 89 mounted in the moving body. Moreover, it is advantageously so constructed that, on overloading (e.g. because of a brake shoe on one side which is jammed and incapable of functioning), it is able to execute torsional movements to set in operation an entraining connection, for example a spring entraining connection, acting as a safety device against breakage.

If, as in the example of FIG. 21, the right-hand brake shoe 15a has come into action, and the left-hand brake shoe 15 on the other hand, owing, for instance, to trouble in the regulator or any other operation-initiating device associated with it, is still in the inoperative state, the connecting linkage between the two brake shoes described above also causes the second brake shoe 15 to be rendered operative by a corresponding rocking motion of the rocking arms 90 and 90a. In this way it is ensured that even in the case of trouble in one of the two operation-initiating devices, there will be reliable initiation of the operation of all the safety braking systems.

FIG. 24 shows a method of rendering the brake operative by means of a speed regulator which responds to the air flow along the moving body. In the case of FIG. 24, it is assumed, in contrast to FIG. 8, for instance, that the guide 1 is again stationary whereas the body which is to be braked, which is not shown as such, moves along this guide in the directions indicated by the arrows X.

A flap 120 is mounted on the moving body and can pivot about an axis 121. The weight of the flap 120 can be substantially compensated by a suitable counter-weight 122. To the flap 120 there is secured a linkage 123 which is shown only diagrammatically in FIG. 24 and which in a practical form of the invention, is so constructed that the pivoting movements of the flap 120 about its axis 121 are transmitted as reciprocating movements to the wedge-shaped brake shoe 15y of a brake according to the invention. Now, if the permitted speed of the moving body is exceeded, for example in the direction indicated by the downwardly directed arrow X, a corresponding intensified air flow Z is produced which acts on the flap 120 and causes a pivoting of the flap 120 into the position 120'. The initiating brake shoe 15y is thereby drawn into the operative position by way of the connection 123. Corresponding circumstances apply in the case of an oppositely directed air flow past the flap 120.

The flap 120 may be loaded by means of a weight 124 for the purpose of adjusting the sensitivity of response. The weight 124 may be adjustable along the bar 125 which pivots about an axis 126 arranged perpendicularly above and parallel with the pivot axis 121. Advantageously, there are stops 127 and 128 arranged either on the flap 120 or (as shown) on the bar 125 and these bear against corresponding suitably adjustable stops 129 and 130 on the moving body when the flap 120 has reached a certain maximum deflection sufficient for initiating the braking operation. The example shown in FIG. 24 illustrates a special feature since two brakes connected in tandem are provided. Both the tandem-connected brakes may correspond in principle to the constructional form shown in FIG. 1 or FIG. 2 or FIG. 3. In FIG. 24 the lower brake, designated the main brake V, is identical with that illustrated in FIG. 1 and, for this reason, the same reference numerals have also been employed. The smaller brake connected in front of the first-mentioned brake and which is designated the auxiliary brake Y, is likewise identical with the brake according to FIG. 1 and, for this reason, it likewise bears the same reference numerals as used in FIG. 1, but with the suffix "y." The auxiliary brake Y is advantageously located on an auxiliary body 131 mounted to be displaceable in the braking direction in the main body to be braked indicated diagrammatically at 132. Inter-connection of the auxiliary brake Y and the main brake V is effected by way of a tension spring 133 connected on the one hand to the auxiliary body 131 and on the other hand to the brake shoe 15 of the main brake V, so that the latter comes into operation as soon as the auxiliary brake Y is applied. In the arrangement described so far, the braking force exerted by the auxiliary brake Y is advantageously kept relatively small so that it does not exert any considerable influence on the braking of the main body 132. It is sufficient for the auxiliary brake Y to respond to the movements of the flap 120 and intensify them to such an extent that the main brake V can also be rendered operative thereby.

Instead of the auxiliary brake Y there may be employed, for the initiation of the operation of the main brake V, a pre-stressed spring (not shown). In such a case the flap 120 acts upon an arresting lever which releases the spring referred to upon initiation of braking.

FIG. 25 shows an electromagnetic device for initiating braking which likewise responds to the speed of the body to be braked. Along the column 1 are disposed permanent magnets 140. On the body to be braked is mounted an electric winding 141 in which is displaceable a core 143 urged by a spring 142 towards the inoperative position. The core 143 is connected by a mechanical pull connection 144, shown only diagrammatically in broken lines, to the brake shoe 15 for initiating the braking action. In this pull connection there may be located a mechanical damping device 145 of conventional type, for example a hydraulic damper.

The construction shown in FIG. 25 is based on the fact that movement of an electrical conductor in a magnetic field causes a current to be induced in the conductor which is proportional to the rate of change of the magnetic field. The arrangement is adjustable to any desired sensitivity of response by appropriately selecting the strength of the permanent magnets 140, the number of turns in the winding 141 and the pre-stressing of the spring 142, which latter may be adjusted by means of an adjusting screw 146. The period of time between the initiation of a state of danger and the actual response of the brake as a result of the passing of one of the permanent magnets 140 can be suited by any desired requirements by varying the spacing of the permanent magnets 140 along the guide 1.

As already explained in connection with the above FIGURES 1–3, the tension of the spring 9 is decisive for the production of the braking force desired in each case. By adjusting the pre-stressing of the spring 9 it is possible to adapt the spring force to the load to be expected, however, it is not possible to vary the spring force during the operation of the device. For this reason it is necessary in any application, to adjust the spring force such that the maximum load to be expected in case of a rupture of say the driving rope safely can be braked down. If, e.g., a catch brake is used for a hoist, the said maximum load results from the net weight of the cage and the working load and the energy of fall.

Besides a complete rupture of the driving rope, however, still other reasons for accidents are possible. E.g. the driving rope may slip over its driving drum. Also in such a case the catch brake will be operated, but, on the other hand, the load to be braked is substantially less because the counter weight usually employed with such types of hoists still is maintaining its balancing action. In the embodiments of the catch brake of the invention described before, the regulating influence of the spring 9 becomes smaller with decreasing load to be braked. If in an extreme case of a small load the catch brake is released, then the brake may grip with total self-jamming without that—despite the presence of spring 9—this self-jamming during the following regulating process of the device as described above will be terminated again. This will lead to a relatively hard engagement of the brake which especially for transporting of passengers is undesired. Thus it may be advantageous to have a brake the braking delay of which is kept substantially constant independently of the reasons of releasing the brake.

FIG. 26 in a diagrammatic form shows an example which meets with this demand. The fundamental structure of a brake of FIG. 26 substantially corresponds with the structure as already explained in connection with FIGS. 4, 5 and 6. The brakeshoe 248 comprises an extension which at the opposite side of a guide 1 carries a supporting segment 249. The adjacent end of the brakeshoe lever 252 is provided with an arcuated toothed rack 250 which matches with an also arcuated part 251 of the supporting segment 249. Thus the catch brake with its brakeshoes 248 and 252 and its swingle 253 again provides a "bird cage."

As to the means for providing a substantially constant braking force those parts which are similar to parts already described earlier are referenced with the same reference numerals, while those parts which in their function are similar to the function of parts already described earlier are referenced with the same reference numerals but with the additional indication a. The embodiment of FIG. 26 uses two springs 9a and 247 instead of the one regulating spring 9 which was applied in the earlier described embodiments. The spring tensions of the said two regulating springs 9a and 247 are adjusted such that the sum of the individual tensions corresponds to the force required for the regulating process at maximum load, i.e. to say the spring tension of the spring 9 shown in the earlier described embodiments. Thus each individual spring 9a and 247 is of smaller spring tension than the earlier spring 9.

As in the earlier embodiments, the pre-stressed spring 9a in its unloaded condition bears against an abutment 10a of the tension rod 168. The rope 243 forming the supporting means for the cage and being not shown in the earlier described embodiments, is connected to the cage only indirectly by means of a lifting hook 242 which engages the chassis part 2 via the spring 247. In order that the tension of the spring 247 may be varied, the one end thereof rests against a plate 244 which bears against the chassis part 2 with adjusting screws 245. The said screws 245 allow for a variation of the distance between plate 244 and chassis part 2 and this variation will cause a corresponding variation of the tension of the spring 247. It may be convenient not to have transferred the full weight of the cage via the spring 247 to the rope 243. Therefore the lifting hook 242 may be provided with an adjustable abutment 246 which during normal operation of the cage rests against the chassis part 2 thereby transferring at least a part of the load directly between hook 242 and chassis part 2.

In case of a rupture of the driving rope the lifting hook 242 by action of the spring 247 will be moved downward with respect to chassis part 2, so that the hook 242 will come to a position (dotted lines in FIG. 26) in which it is resting upon an abutment plate 241 which adjustably by means of a nut 240 is held on the lower end 70a of the tension rod. At the same time and in the same way as already described earlier the catch brake by action of the tension element 19 is brought to an (frictional) engagement with the guide 1. The cage continues with its falling movement until the stop 3 comes to an abutment with the adjacent end of the swingle 253. At this time of the operation the regulating process which already in details is described earlier is being started. Contrary to the earlier embodiments however, in the embodiment of FIG. 26, both of the springs 9a and 247 are taking part in the regulating of the braking force.

If the catch brake is released not by a rupture of the rope 243 but by some other reasons which do not call for a maximum braking force, the lifting hook 242 remains in its original position relative to the chassis part 2. This position is shown in FIG. 26 in full lines, and it is easily to be noted that the spring 247 will not be brought to any regulating operation. Thus the complete regulating process will be carried out with the (weaker) spring 9a in the manner already described.

FIG. 27 shows a further embodiment of a speed-sensitive regulator for releasing the catch brake of the invention. A part 277 of the cage carries a swinging arm 275 which with its opposite end is pressed against a linear guide 279. The said opposite end of the arm 275 carries a roller 278. A two-arm-lever 273 swingably is mounted on the arm 275. Similar to the embodiments of FIGS. 11–18 this mounting comprises a very thin flexible axle 265. This axle by means of an axle journal 266 is secured against an undue deformation in the manner also already described earlier.

The two-arm-lever 263 at its one end carries a jumping wheel 262 which during the operation of the hoist is running down a jumping curve 260 which is extending over the complete range of the hoist travel. The jumping wheel 262 is pressed against the jumping curve 260 by means of the tension of an adjustable spring 264 and this tension is chosen so that, if a pre-determined critical velocity of the cage is reached, the radial excursions of the lever 263 against the tension of the spring 264 become large enough to produce an engagement between a ratchet 270 and one of some teeth provided on the jumping curve 260. As it can be noted from FIG. 27, the ratchet 270 is carried in a bore at the other end of the two-arm-lever 263 opposite of the jumping wheel 262. The ratchet 270 is loaded by a spring 268 the tension of which is adjustable by means of an adjustment screw 267 which is threaded into the said bore.

As soon as the ratchet 270 in the described manner has been locked, the two-arm-lever 263 and the arm 275 are pivoted on the mounting of arm 275 at chassis part 277. This will result in a variation of the distance of the ratchet carrying end of the lever 263 with respect to the jumping curve 260. In the embodiment shown in FIG. 27 this varied distance will be compensated by the displaceable guidance of the ratchet 270 within the lever 263. The said pivotal movement of the arm 275 continues until this arm abuts on a screw 280 which is carried in the chassis part 277. The abutment level of screw 280 thus is adjustable and screw 280 also is used for varying the tension of a damping spring 276 which acts against the said pivotal movement of the arm 275. During the said pivotal movement of the arm 275 together with the lever 263 a tension element 272 will be moved upwardly. This tension element 272 with its other end acts on the braking arrangement in the manner already described earlier so that the operation of the catch brake is released. In the rest condition, i.e. to say when the braking operation has not been initiated, the tension element 272 is held against the chassis part 277 by means of an adjustable abutment 274 carried by the tension element 272.

The regulator shown in FIG. 27 has the advantage that its sensitivity can be varied over different ranges of hoist travel. Such variation of the sensitivity of the releasing velocity of the catch brake arrangement can be produced by a different dimensioning of the respective parts of the jumping curve 260. This adjustment feature of the regulator according to FIG. 27 is important especially in the range near the down end of hoist travel, because it is essential that within this range a catch brake is released within a height of fall as short as possible.

I claim:

1. A device for transmitting frictional force between a first body and a second body, said bodies being movable relative to each other, said device comprising first and second friction-applying members carried by said first body, means for moving said friction-applying members into operative engagement with said second body including means operatively connecting said friction-applying members, means for biasing said first friction-applying member towards said first body, and means for guiding said first friction-applying member in movement away from said first body, said first friction-applying member moving away from said first body in an amount determined by the frictional engagement between said first friction-applying member and said second body, whereby the frictional force and the force of said biasing means acting upon said first friction-applying member are maintained in substantial balance.

2. The device of claim 1 wherein said biasing means includes a pre-stressed spring member and means are provided for adjusting the stress of said spring member.

3. The device of claim 1 wherein said biasing means includes a tension spring and a compression spring acting on opposite sides of said first friction-applying member, said first friction-applying member having its braking surface positioned substantially parallel to said second body.

4. The device of claim 1 wherein a plurality of sets of said first and second friction-applying members is provided, said sets being operatively connected together.

5. A device for transmitting force between a first body and a second body, said bodies being movable relative to each other, said device comprising first and second friction-applying members carried by said first body, means for moving said friction-applying members into operative engagement with said second body including means operatively connecting said friction-applying members, a seat on said first body for supporting said first friction-applying member and maintaining it away from said second body while in the inoperative position, spring means for biasing said first friction-applying member towards said seat, and means for guiding said first friction-applying member in its movement away from said seat and in opposition to said spring means, said first friction-applying member moving away from said first body in an amount determined by the amount of frictional engagement between said first friction-applying member and said second body, whereby the friction force and the biasing force of said spring means acting upon said first friction-applying member are maintained in substantial balance.

6. The device of claim 5 wherein said spring means includes a plurality of springs which are adapted to be successively activated.

7. The device of claim 6 wherein two compression springs are provided, each of said springs having different adjusted spring tensions, one of said springs being normally maintained in an operating condition.

8. The device of claim 5 wherein an aperture is provided in said first body and said first friction-applying member includes a shaft portion which projects through said aperture, to thereby maintain said first friction-applying member at a distance from said second body, said first friction-applying member being adapted to move away from said seat a predetermined amount before said spring means becomes effective, whereby said first friction-applying member moves radially with respect to said seat.

9. A device for transmitting force between a first body and a second body, said bodies being movable relative to each other, said device comprising first and second brake shoes carried by said first body, means for moving said brake shoes into operative engagement with said second body means operatively connecting said first and second brake shoes, a seat for supporting said first brake shoe, an aperture in said first body and adjacent said seat, a shaft on said first brake shoe extending through said aperture, a compression spring carried by said shaft for normally biasing said first brake shoe into engagement with said seat, and means for guiding said first brake shoe in its movement away from said seat and in opposition to the biasing force of said spring, said first brake shoe moving away from said seat in an amount determined by the amount of frictional engagement between said first brake shoe and said second body, whereby the frictional force and the biasing force of said spring acting upon said first brake shoe are maintained in substantial balance.

10. The device of claim 9 wherein said spring is biased between upper and lower abutment discs carried by said shaft.

11. The device of claim 10 wherein said upper abutment disc has a spherical surface which co-operates with an adjacent portion of said first body to permit tilting of said first brake shoe.

12. A device for transmitting force between a moving body and a co-operating guide member, said device comprising first and second brake shoes carried by said moving body, means for moving said brake shoes into operative engagement with said guide member including means for operatively connecting said brake shoes, said moving body having an aperture in a portion thereof extending from a first surface to a second and opposite surface thereof, a seat formed in said first surface and at said aperture, a shaft portion on said first brake shoe and being adapted to pass into said aperture, a spring carried by said shaft portion and being positioned below said second surface, said spring normally biasing said first brake shoe into engagement with said seat, and means for guiding said first brake shoe in its movement away from said seat, said first brake shoe moving away from said moving body in an amount determined by the amount of frictional engagement between said first brake shoe and said guide member, whereby the frictional force and the biasing force of said spring acting upon said first brake shoe are maintained in substantial balance.

13. The device of claim 12 wherein said spring is pre-stressed between a pair of disc members positioned on said shaft portion and said shaft portion is provided with a shoulder which extends a predetermined distance below said second surface, one of said discs being biased against said shoulder, whereby as said first brake shoe moves out of engagement with said seat, it moves through a predetermined distance before said spring becomes effective.

14. A device for transmitting frictional force between a first body and a second body, said bodies being movable relative to each other, said device comprising first and second brake shoes, means for operatively connecting said brake shoes, means for actuating said brake shoes into operative frictional engagement with said second body, a first well in said first brake shoe, a second well in a portion of said first body, a connecting member passing between said first and second well to thereby provide means for permitting said first brake shoe to tip relative to said first body, an aperture positioned in said portion of said first body and lateral of said second well, a shaft extending from said first brake shoe into said aperture, spring means carried by said shaft for biasing said first brake shoe towards said portion of first body, and means for guiding said first brake shoe in its movement away from said first body, said first brake shoe moving away from said first body in an amount determined by the amount of frictional engagement between said first brake shoe and said second body, whereby the frictional force and the biasing force of said spring means acting upon said first brake shoe are maintained in substantial balance.

15. A device for transmitting frictional force between a first body and a second body, said bodies being movable relative to each other, said device comprising first and second friction-applying members carried by said first body and positioned on opposite sides of said second body, means for biasing said first friction-applying member towards a portion of said first body, a swingable member pivotally connected at one of its end portions to said first friction-applying member, the other end portion of said swingable member acting against said second friction-applying member, means for moving said swingable member to an inclined position for causing said friction-applying member to operatively engage opposite sides of said second body, an abutment on said second body for limiting movement of said second friction-applying member in one direction, whereby said swingable member guides the movement of said first friction-applying member in its movement away from said portion of said first body, said first friction-applying member moving away from said first body in an amount determined by the amount of frictional engagement between said first friction-applying member and said second body, whereby the frictional force and the force of said biasing means acting upon said first friction-applying member are maintained in substantial balance.

16. The device of claim 15 wherein said second swingable member has an inclined surface and said swingable member has its said other end portion movably positioned on said inclined surface, whereby before said second friction-applying member contacts said second body, the distance of said first friction-applying member and of said second friction-applying member from said second body is reduced and after said friction-applying members operatively engage said second body, said swingable member is fixedly wedged in place on said second friction-applying member.

17. The device of claim 16, wherein said inclined surface includes grooves and said swingable member carries a roller member which is adapted to bear against said grooves, to thereby maintain said other end portion of said swingable member in position on said second friction-applying member.

18. The device of claim 15, wherein said abutment includes a spring-biased stop means which is adapted to normally bias said swingable member against said inclined surface.

References Cited by the Examiner

UNITED STATES PATENTS

| | | | |
|---|---|---|---|
| 1,165,583 | 12/15 | Farmer | 188—189 |
| 1,178,942 | 4/16 | Pero et al. | 187—88 |
| 2,717,663 | 9/55 | Higgins | 188—44 |
| 2,931,466 | 4/60 | Allenbaugh | 188—188 |

MILTON BUCHLER, *Primary Examiner.*

ARTHUR L. LA POINT, EUGENE G. BOTZ,
*Examiners.*